(12) United States Patent
Cannon et al.

(10) Patent No.: US 11,604,789 B1
(45) Date of Patent: Mar. 14, 2023

(54) BI-DIRECTIONAL QUERY UPDATES IN A USER INTERFACE

(71) Applicant: Splunk Inc., San Francisco, CA (US)

(72) Inventors: Finlay Cannon, Vancouver (CA); Jindrich Dinga, Cupertino, CA (US); Thomas Haggie, Victoria (CA); Clark E. Mullen, San Mateo, CA (US); Jonathan Ng, Vancouver (CA); Andrew John Peters, Sammamish, WA (US); Bardhi Shtylla, Scottsdale, AZ (US); Ioan Popa, Fremont, CA (US); Barbara Janczer, San Francisco, CA (US); Jacob Sebastian Stark, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/444,161

(22) Filed: Jul. 30, 2021

Related U.S. Application Data

(60) Provisional application No. 63/182,606, filed on Apr. 30, 2021.

(51) Int. Cl.
*G06F 16/242* (2019.01)
*G06F 16/248* (2019.01)
*G06F 40/30* (2020.01)

(52) U.S. Cl.
CPC ........ *G06F 16/2428* (2019.01); *G06F 16/248* (2019.01); *G06F 16/2423* (2019.01); *G06F 40/30* (2020.01)

(58) Field of Classification Search
CPC ............. G06F 16/2428; G06F 16/2423; G06F 16/248; G06F 40/30

USPC .......................................................... 707/722
See application file for complete search history.

(56) References Cited

U.S. PATENT DOCUMENTS

| | | | |
|---|---|---|---|
| 6,473,503 B1 | 10/2002 | Karau et al. | |
| 6,707,476 B1 | 3/2004 | Hochstedler | |
| 7,822,707 B1* | 10/2010 | Yehuda | G06F 16/248 707/792 |
| 7,937,344 B2 | 5/2011 | Baum et al. | |
| 8,112,425 B2 | 2/2012 | Baum et al. | |
| 8,166,071 B1* | 4/2012 | Korablev | G06F 21/604 707/783 |
| 8,364,460 B2 | 1/2013 | Ostermeyer et al. | |

(Continued)

OTHER PUBLICATIONS

Splunk Enterprise 8.0.0 Overview, available online, retrieved May 20, 2020 from docs.splunk.com.

(Continued)

*Primary Examiner* — Joshua Bullock
(74) *Attorney, Agent, or Firm* — Knobbe, Martens, Olson & Bear, LLP

(57) ABSTRACT

A system is described that receives a query model of a query that includes one or more query commands. The query model includes a command model that corresponds to at least query command of the one or more query commands. The system uses the command model to generate an interactive action model summary and causes a user interface to display the query and the interactive action model summary in a query actions panel. A modification to the query in the user interface causes an update to the query actions panel and a modification to the action model summary causes an update to the at least one query command of the query.

20 Claims, 20 Drawing Sheets

(56) References Cited

U.S. PATENT DOCUMENTS

| | | | |
|---|---|---|---|
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,576,007 B1 | 2/2017 | Sivathanu et al. | |
| 9,641,334 B2* | 5/2017 | Faitelson | G06F 9/468 |
| 9,667,676 B1 | 5/2017 | Lo et al. | |
| 10,120,914 B2 | 11/2018 | Vogt | |
| 10,127,258 B2 | 11/2018 | Lamas et al. | |
| 10,409,440 B2 | 9/2019 | Blinn et al. | |
| 10,452,650 B1 | 10/2019 | Monaharan et al. | |
| 10,776,366 B1 | 9/2020 | Astretsov et al. | |
| 10,909,130 B1 | 2/2021 | Scott et al. | |
| 11,113,294 B1 | 9/2021 | Bourbie et al. | |
| 11,216,511 B1 | 1/2022 | Bigdelu et al. | |
| 11,263,268 B1 | 3/2022 | Bourbie et al. | |
| 11,269,871 B1 | 3/2022 | Bigdelu et al. | |
| 11,386,158 B1 | 7/2022 | Bourbie et al. | |
| 2001/0055017 A1 | 12/2001 | Ording | |
| 2002/0169764 A1 | 11/2002 | Kincaid et al. | |
| 2003/0058280 A1 | 3/2003 | Molinari et al. | |
| 2004/0030682 A1 | 2/2004 | Porter et al. | |
| 2005/0004911 A1 | 1/2005 | Goldberg et al. | |
| 2005/0015361 A1 | 1/2005 | Payton et al. | |
| 2005/0015368 A1 | 1/2005 | Payton et al. | |
| 2005/0076305 A1 | 4/2005 | Hintermeister et al. | |
| 2006/0004707 A1 | 1/2006 | Dettinger et al. | |
| 2006/0064674 A1 | 3/2006 | Olson, Jr. et al. | |
| 2006/0218479 A1 | 9/2006 | Torres | |
| 2007/0022125 A1* | 1/2007 | Salam | G06F 16/951 |
| 2007/0043702 A1 | 2/2007 | Lakshminarayanan et al. | |
| 2007/0088723 A1* | 4/2007 | Fish | G06F 16/2282 |
| 2007/0118491 A1 | 5/2007 | Baum et al. | |
| 2007/0174188 A1* | 7/2007 | Fish | G06Q 20/10 |
| | | | 705/39 |
| 2007/0282797 A1 | 12/2007 | Wang et al. | |
| 2008/0025616 A1 | 1/2008 | Bryll | |
| 2008/0114730 A1 | 5/2008 | Larimore et al. | |
| 2008/0195649 A1* | 8/2008 | Lefebvre | G06F 16/252 |
| | | | 707/999.102 |
| 2008/0215546 A1 | 9/2008 | Baum et al. | |
| 2008/0243784 A1 | 10/2008 | Stading | |
| 2008/0243807 A1 | 10/2008 | Caucas et al. | |
| 2009/0019020 A1 | 1/2009 | Dhillon et al. | |
| 2009/0228464 A1 | 9/2009 | Jones et al. | |
| 2009/0276421 A1 | 11/2009 | Qiu | |
| 2009/0319518 A1 | 12/2009 | Koudas et al. | |
| 2009/0327240 A1* | 12/2009 | Meehan | G06F 16/248 |
| 2010/0049692 A1* | 2/2010 | Astito | G06F 16/2452 |
| | | | 707/769 |
| 2010/0135582 A1 | 6/2010 | Gokturk et al. | |
| 2010/0299458 A1 | 11/2010 | Marking et al. | |
| 2010/0306590 A1 | 12/2010 | Anand et al. | |
| 2011/0066629 A1 | 3/2011 | Escalante et al. | |
| 2011/0078055 A1 | 3/2011 | Faribault et al. | |
| 2011/0126232 A1 | 5/2011 | Lee et al. | |
| 2011/0179024 A1 | 7/2011 | Stiver et al. | |
| 2012/0005044 A1* | 1/2012 | Coleman | G06Q 30/02 |
| | | | 705/27.2 |
| 2012/0110474 A1 | 5/2012 | Chen et al. | |
| 2012/0221553 A1 | 8/2012 | Wittmer et al. | |
| 2012/0246165 A1 | 9/2012 | Batraski et al. | |
| 2012/0246173 A1 | 9/2012 | Wittmer et al. | |
| 2012/0271741 A1 | 10/2012 | Leonard | |
| 2013/0073542 A1 | 3/2013 | Zhang et al. | |
| 2013/0080460 A1 | 3/2013 | Tomko et al. | |
| 2013/0124542 A1 | 5/2013 | Lee et al. | |
| 2013/0159832 A1 | 6/2013 | Ingargiola et al. | |
| 2013/0238747 A1 | 9/2013 | Albouze et al. | |
| 2013/0290291 A1 | 10/2013 | Loffbourrow et al. | |
| 2013/0304760 A1 | 11/2013 | Torii | |
| 2013/0326620 A1 | 12/2013 | Merza et al. | |
| 2014/0019909 A1 | 1/2014 | Leonard et al. | |
| 2014/0074887 A1 | 3/2014 | Neels et al. | |
| 2014/0082013 A1 | 3/2014 | Wolf et al. | |
| 2014/0188862 A1 | 7/2014 | Campbell et al. | |
| 2014/0214976 A1 | 7/2014 | Zhou et al. | |
| 2014/0222798 A1 | 8/2014 | Want et al. | |
| 2014/0281868 A1 | 9/2014 | Vogel et al. | |
| 2014/0324825 A1 | 10/2014 | Gopinath et al. | |
| 2014/0344304 A1 | 11/2014 | Topatan et al. | |
| 2015/0212663 A1 | 7/2015 | Papale et al. | |
| 2015/0213127 A1 | 7/2015 | Chang et al. | |
| 2015/0309689 A1 | 10/2015 | Jin et al. | |
| 2016/0004736 A1* | 1/2016 | Tsuchida | G06F 16/2455 |
| | | | 707/742 |
| 2016/0004741 A1* | 1/2016 | Johnson | G06F 16/23 |
| | | | 707/783 |
| 2016/0012045 A1 | 1/2016 | Franceschini et al. | |
| 2016/0062555 A1 | 3/2016 | Ward et al. | |
| 2016/0085785 A1 | 3/2016 | Hoffmann | |
| 2016/0092485 A1 | 3/2016 | Lamas et al. | |
| 2016/0103883 A1 | 4/2016 | Ramani et al. | |
| 2016/0119388 A1 | 4/2016 | Sitrick et al. | |
| 2016/0210300 A1 | 7/2016 | Plakhov et al. | |
| 2016/0224532 A1 | 8/2016 | Miller et al. | |
| 2016/0292285 A1 | 10/2016 | Lee et al. | |
| 2017/0052654 A1 | 2/2017 | Cervelli et al. | |
| 2017/0140011 A1 | 5/2017 | Kuefer et al. | |
| 2017/0228711 A1 | 8/2017 | Chawla et al. | |
| 2017/0235799 A1 | 8/2017 | Miller et al. | |
| 2017/0262754 A1 | 9/2017 | Mizuno et al. | |
| 2017/0308610 A1 | 10/2017 | Mullins et al. | |
| 2017/0315677 A1 | 11/2017 | Rice et al. | |
| 2017/0351951 A1 | 12/2017 | Santos et al. | |
| 2017/0352380 A1 | 12/2017 | Douombouya et al. | |
| 2017/0364506 A1* | 12/2017 | Stern | G10L 15/26 |
| 2018/0004364 A1 | 1/2018 | Wu | |
| 2018/0024701 A1 | 1/2018 | Sanches et al. | |
| 2018/0025041 A1 | 1/2018 | Gray et al. | |
| 2018/0173390 A1 | 6/2018 | Dunne et al. | |
| 2018/0173477 A1 | 7/2018 | Porwal et al. | |
| 2018/0232394 A1 | 8/2018 | Danziger et al. | |
| 2018/0246983 A1 | 8/2018 | Rathod | |
| 2018/0285445 A1 | 10/2018 | Lu | |
| 2018/0322169 A1 | 11/2018 | Kaufman et al. | |
| 2018/0357320 A1 | 12/2018 | Li et al. | |
| 2019/0034528 A1 | 1/2019 | Lintz | |
| 2019/0065567 A1 | 2/2019 | Griffith et al. | |
| 2019/0073610 A1 | 3/2019 | Rousselot | |
| 2019/0098106 A1 | 3/2019 | Mungel et al. | |
| 2019/0146970 A1 | 5/2019 | Chameih et al. | |
| 2020/0110842 A1 | 4/2020 | Teo et al. | |
| 2020/0134683 A1 | 4/2020 | Boren et al. | |
| 2022/0138606 A1* | 5/2022 | Pasour | G06N 3/084 |
| | | | 706/52 |
| 2022/0188306 A1 | 6/2022 | Bigdelu et al. | |
| 2022/0309248 A1* | 9/2022 | Liu | G06N 5/022 |
| 2022/0309411 A1* | 9/2022 | Ramaswamy | |
| | | | G06Q 10/063114 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

SLAML 10 Reports, Workshop On Managing Systems via Log Analysis and Machine Learning Techniques, ;login: Feb. 2011 Conference Reports.

Office Action for U.S. Appl. No. 17/444,152, dated Dec. 6, 2022; 17 pages.

Chitu, Alex, Google Tests New Site Search Box (2014).

(56) References Cited

OTHER PUBLICATIONS

Hoque, et al., "Applying Pragmatic Principles for Interaction with Visual Analytics," IEEE Transactions On Visualization and Computer Graphics, vol. 24, No. 1, Jan. 2018.
U.S. Appl. No. 16/513,584**, filed Jul. 16, 2019.
U.S. Appl. No. 16/513,571**, filed Jul. 16, 2019.
U.S. Appl. No. 16/513,556**, filed Jul. 16, 2019.
U.S. Appl. No. 16/513,544**, filed Jul. 16, 2019.
U.S. Appl. No. 16/657,988**, filed Oct. 18, 2019.
U.S. Appl. No. 17/444,152**, filed Jul. 30, 2021.
U.S. Appl. No. 17/589,558**, filed Jan. 31, 2022.
U.S. Appl. No. 17/589,677**, filed Jan. 31, 2022.
U.S. Appl. No. 17/589,796**, filed Jan. 31, 2022.
U.S. Appl. No. 17/652,888**, filed Feb. 28, 2022.
U.S. Appl. No. 17/811,821**, filed Jul. 11, 2022.
U.S. Appl. No. 17/816,337**, filed Jul. 29, 2022.
U.S. Appl. No. 17/816,357**, filed Jul. 29, 2022.
U.S. Appl. No. 17/816,359**, filed Jul. 29, 2022.
U.S. Appl. No. 17/816,361**, filed Jul. 29, 2022.

\* cited by examiner

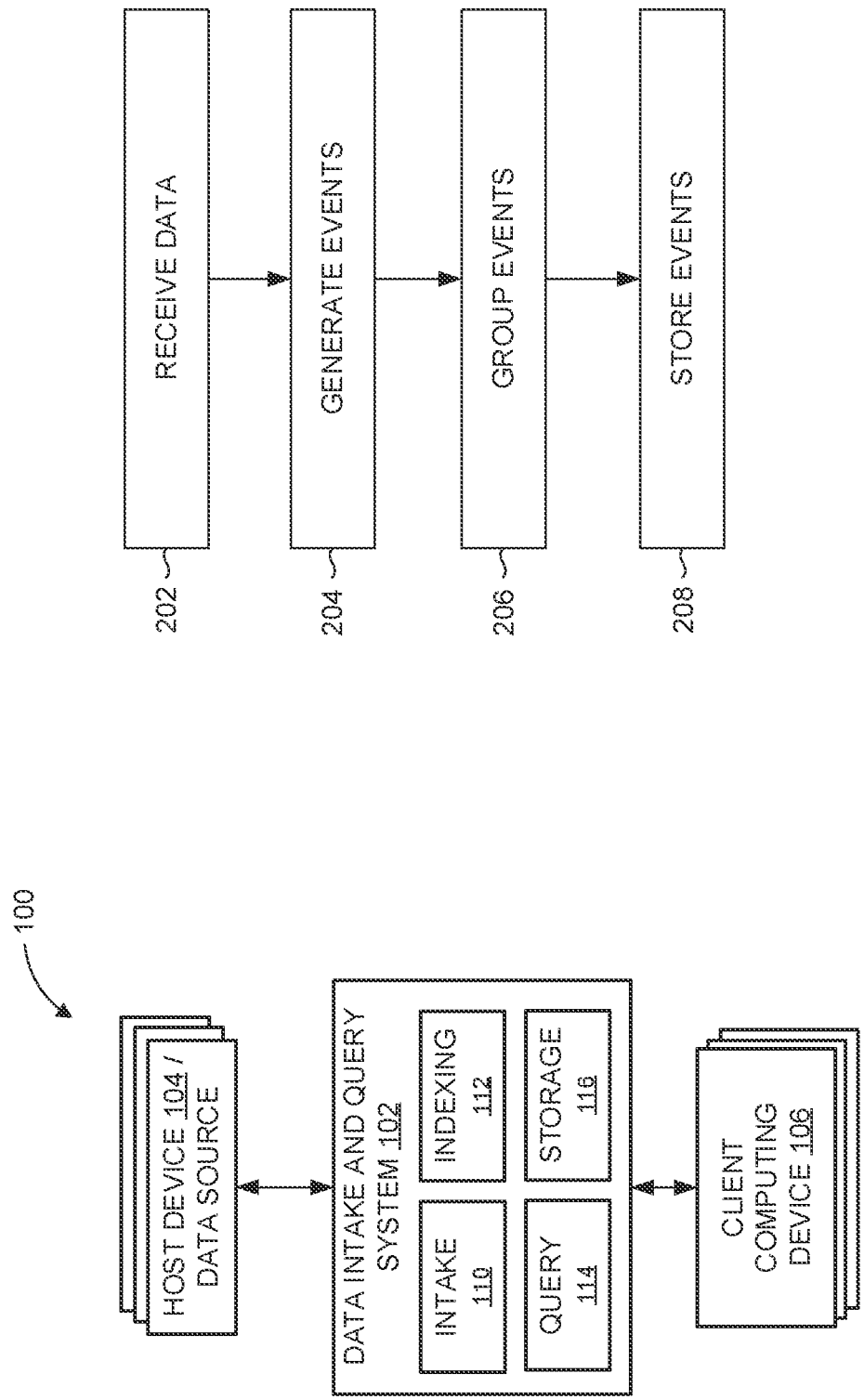

```
                                    ┌─302
                                    ▼      ┌─302A
127.0.0.1 - - eva [10/Oct/2000:13:55:36 -0700] "GET /apache.gif HTTP/1.0" 200 2326 0.0947
127.0.0.1 - - emerson [10/Oct/2000:13:56:36 -0700] "GET /eastwood.gif HTTP/1.0" 200 2980
0.0899              ┌─302C        ─302B
127.0.0.3 - - eliza [10/Oct/2000:13:57:36 -0700] "GET /ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif        ┌─302E             ─302D
91.205.189.15 - - [28/Apr/2014:18:22:16] "GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159
            ┌─304
            ▼
docker: {
        container_id: f7360a148a670c4c257f4ee024be81284b6017d72ae41ea8ee5d
}                                   ┌─304A
kubernetes: {
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal    ┌─304B
}
log: I0503 23:04:12.595203   1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}
        ┌─306
        ▼
```

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

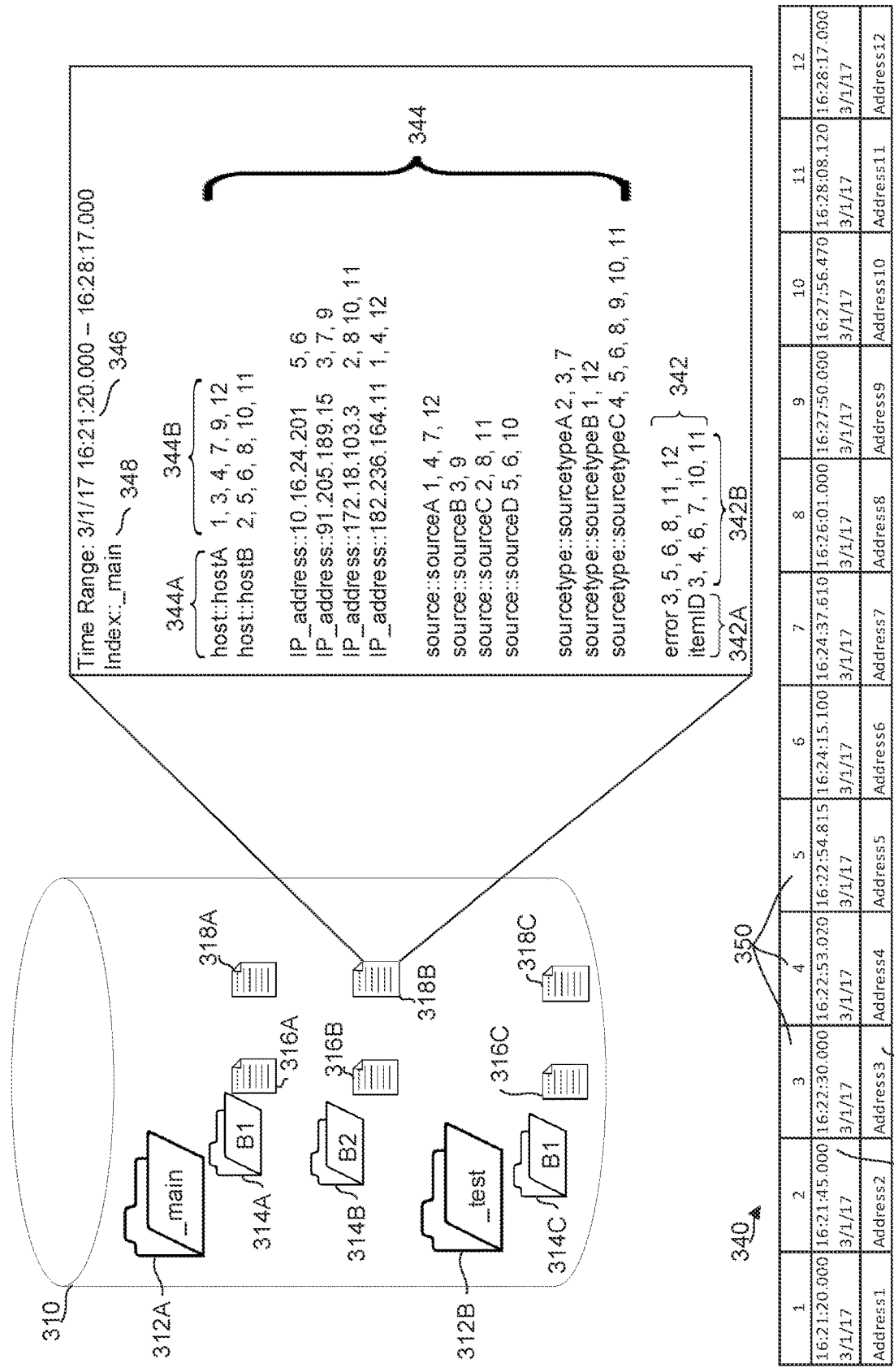

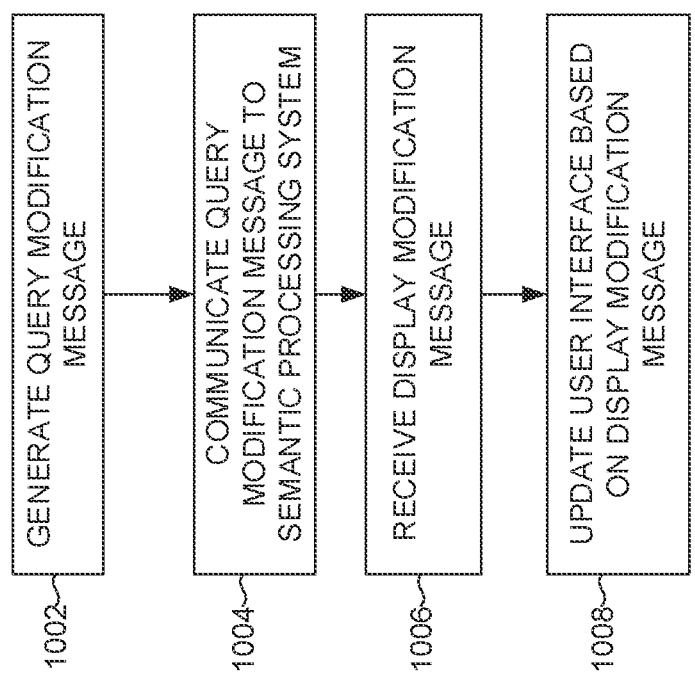

BI-DIRECTIONAL QUERY UPDATES IN A USER INTERFACE

RELATED APPLICATIONS

Any and all applications for which a foreign or domestic priority claim is identified in the Application Data Sheet as filed with the present application are incorporated by reference under 37 CFR 1.57 and made a part of this specification. This application is being filed on Jul. 30, 2021 concurrently with the following U.S. patent application, which is incorporated herein by reference for all purposes: U.S. application Ser. No. 17/444,152, entitled UPDATING QUERY AND ACTION PANEL BASED ON INTERACTION WITH QUERY RESULTS.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIGS. 3B and 3C are block diagrams illustrating embodiments of various data structures for storing data processed by the data intake and query system.

FIG. 6 is a non-limiting example of a GUI that can be generated by the query interface system.

FIGS. 7A-7D and 8A-8D are diagrams illustrating example GUIs generated by the query interface system.

FIG. 10 is a flow diagram illustrating an embodiment of a routine implemented by the query interface system to update one or more panels of a user interface based on a user interaction with another panel.

DETAILED DESCRIPTION

Figure 3B:
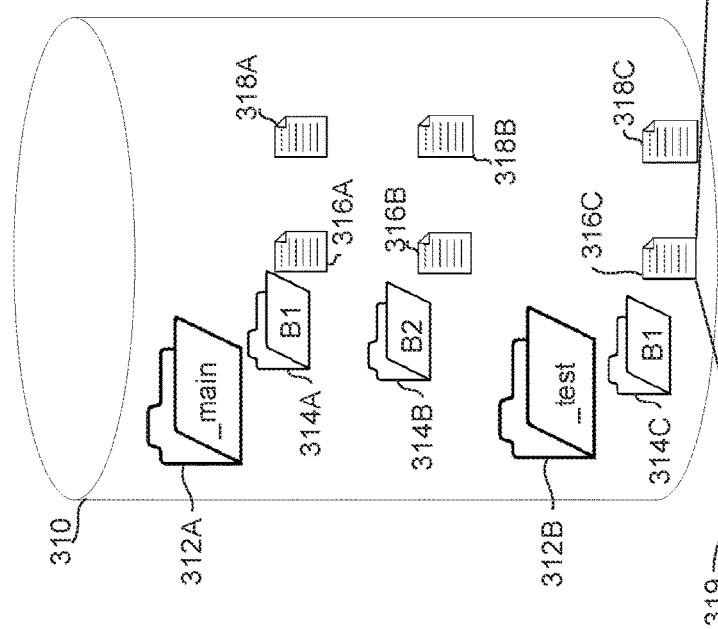

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data, which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an extraction action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored, or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip 172 20 43 173.ec2.internal, pod_id:0a73017b-4efa-11e8-a4el-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 12 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype:: sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example, if an event has a sourcetype "splunkd," host "www1" and token "warning," then the unique identifier for the event can appear in the field-value pair entries 344 "sourcetype:: splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype:: sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "source-type::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
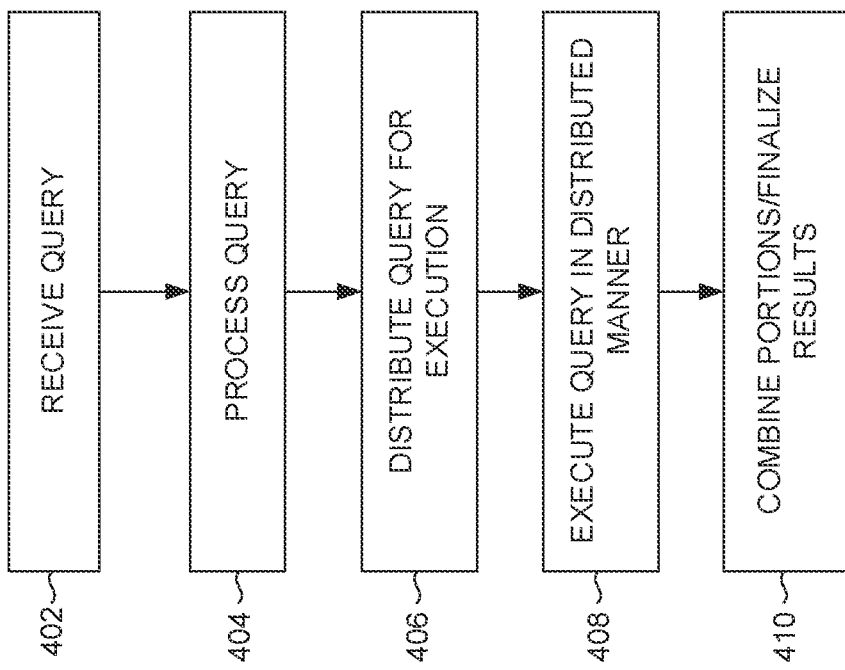
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition, as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
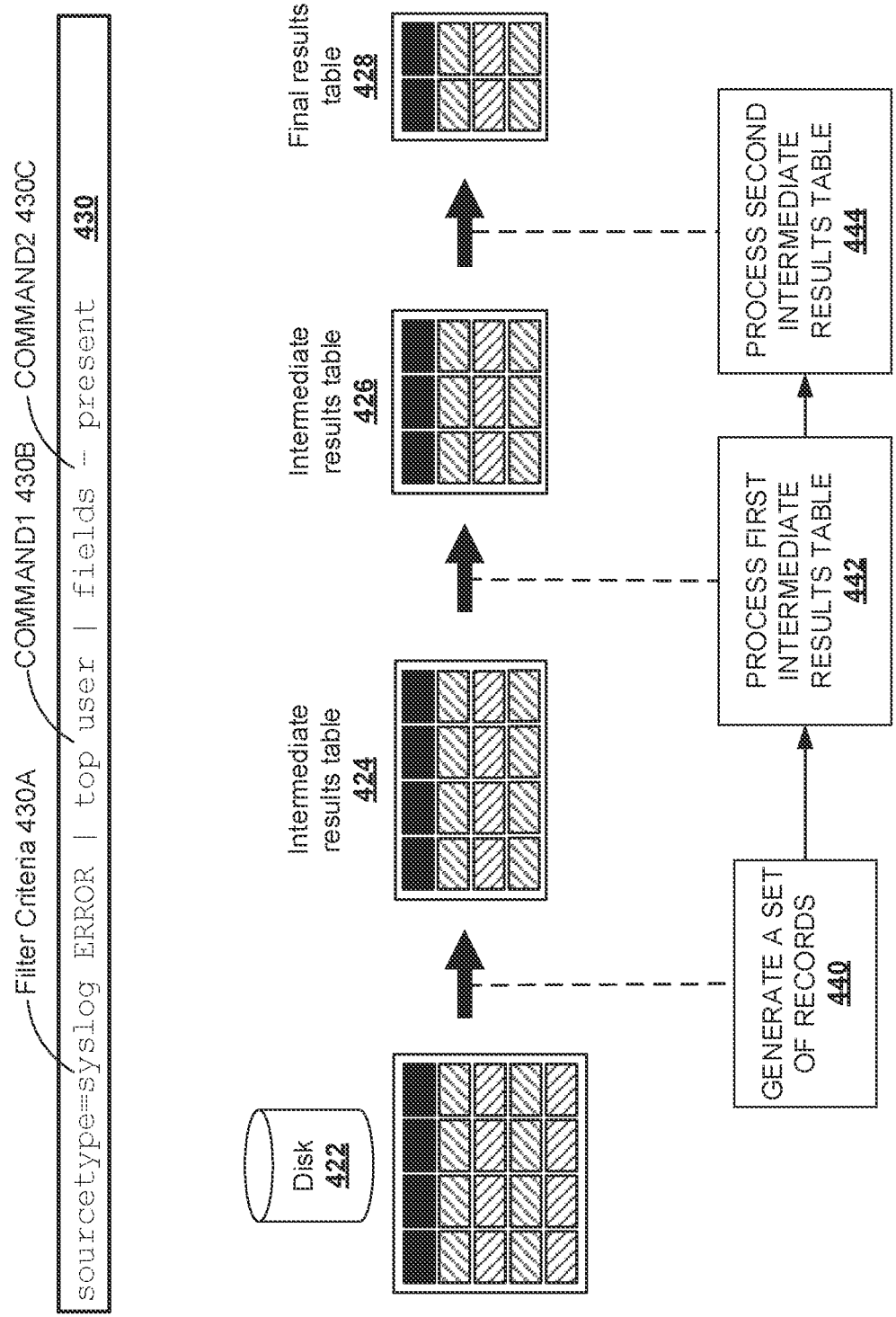
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," "percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
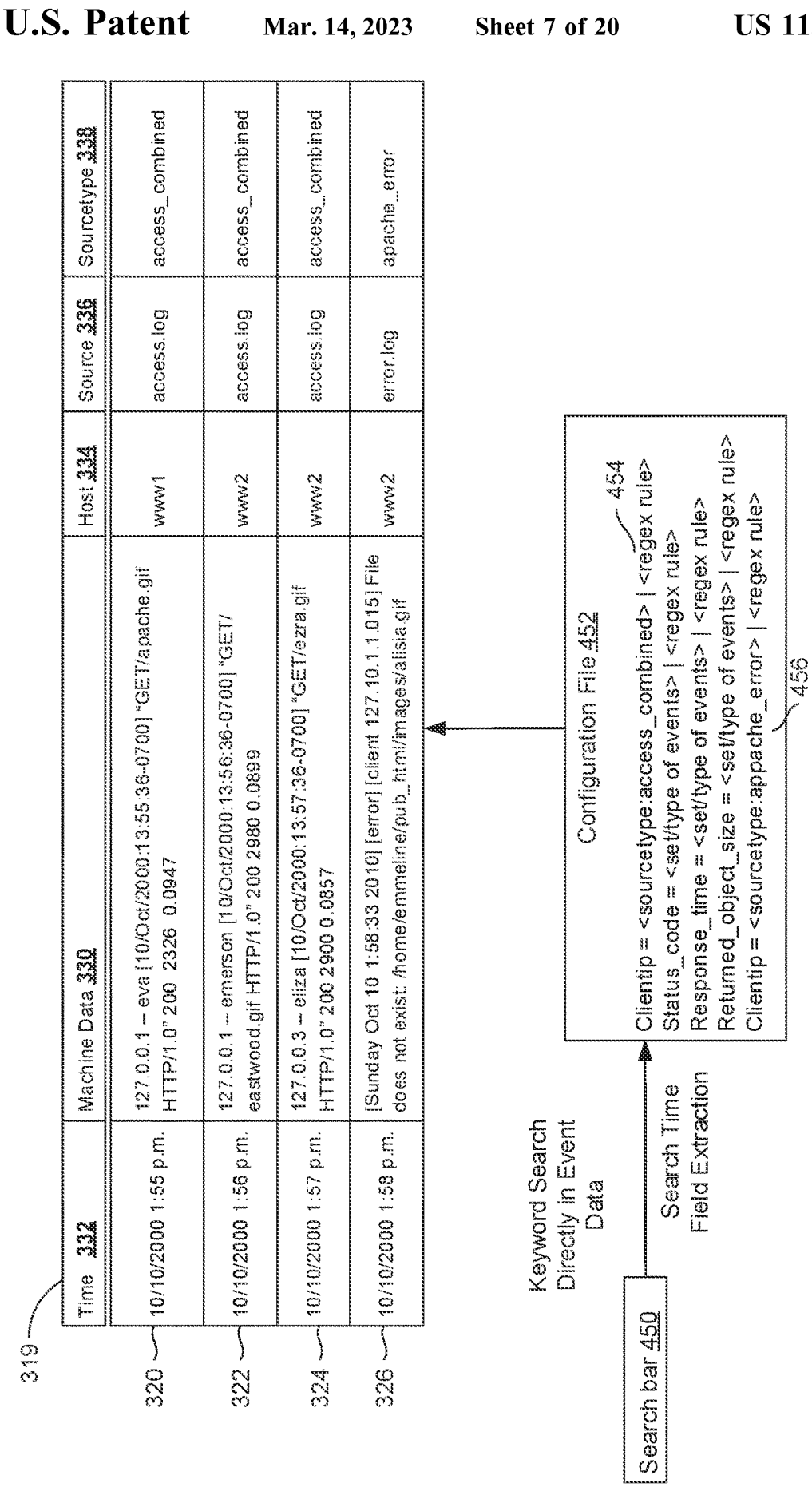
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error"|stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error"|prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
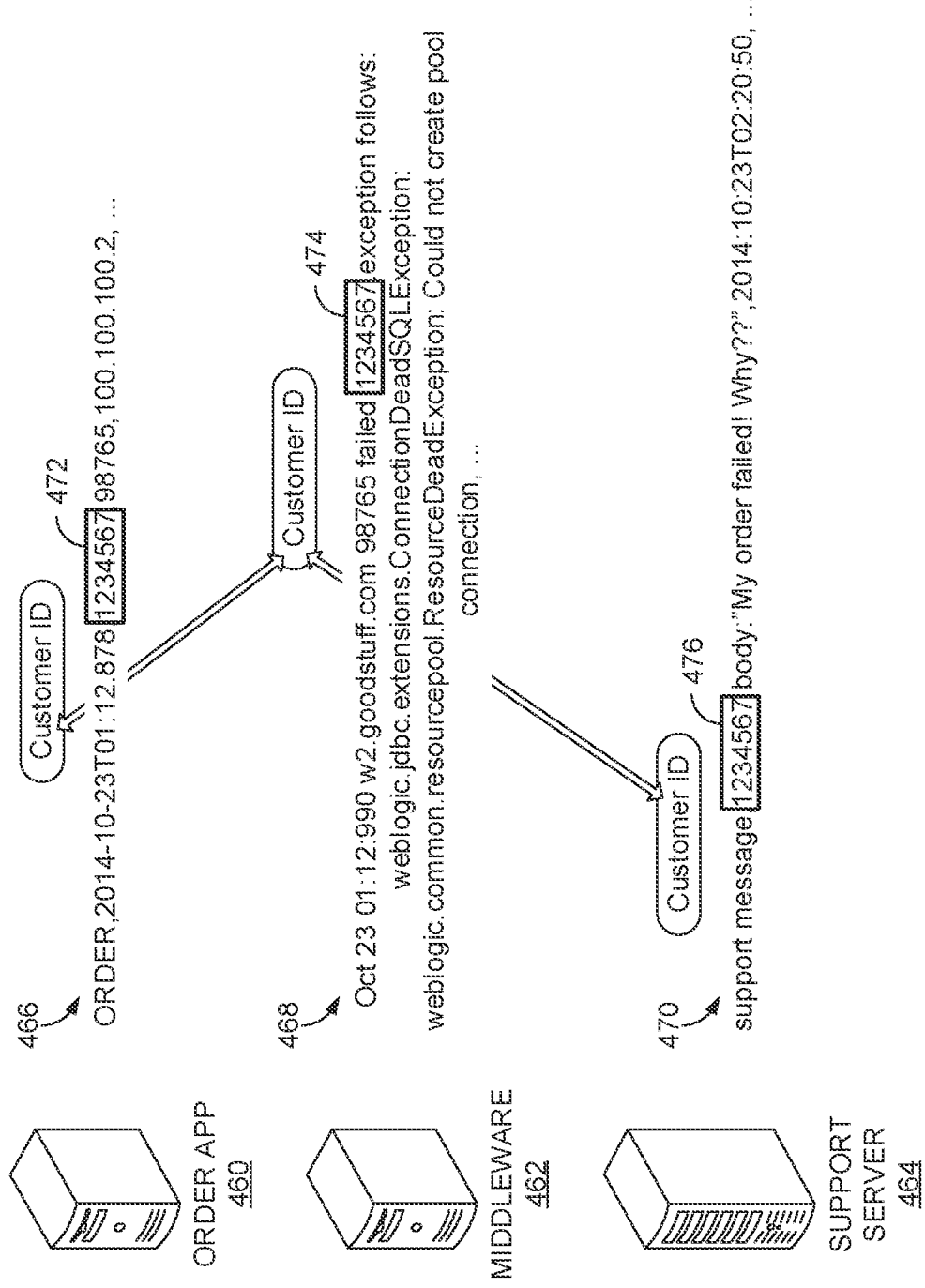
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Bi-Directional Query Updates Overview

Given the amount of data ingested by a data intake and query system 108 (e.g., gigabytes of data, terabytes of data, etc.) and the myriad of ways in which the data can be identified, searched, and processed, it can be difficult for a user to know where to begin. In addition, some users of a data intake and query system 108 may be unfamiliar with the architecture of the data intake and query system or the query language used to query the ingested data. These obstacles can make it difficult for a user to obtain meaningful insights from the data.

Queries displayed on a user interface, such as a graphical user interface (also referred to herein as a GUI) can span many lines of code and be complex and difficult to understand or parse. While the query may include comments or an outline, they are written by a user and static in that they do not dynamically change without user input. In addition, depending on how they are written, the outline or comments may not improve the understanding of the query commands themselves. Moreover, the comments or query outline do not enable a user to modify the query indirectly (e.g., by modifying the outline).

The content of a user interface that displays a query may also be relatively static or unidirectional. For example, the user interface may provide a query outline to help understand the structure of a query or display the results of the query but require direct editing of the query to make any changes to the query, query outline, or query results. Alternatively, a user interface may allow a user to click on one or more display objects, and, based on the selection, run a predetermined back-end query that the user does not see and therefore cannot understand or modify.

Given the amount and complexity of the data being ingested and the complexity of corresponding queries, such limitations can make it difficult to create a meaningful query that searches and transforms the data in a meaningful way. Moreover, given the amount of data to be searched and complexity of a query, one query may take several minutes, hours, or even days to complete. Thus, running additional queries or inefficient queries can create a bottleneck or burden on the underlying hardware resources.

To address these issues, a bi-directional user interface can be provided that enables a user to view and directly modify a query and/or modify the query via interaction with other portions of the GUI, such as an actions panel or query results. In some cases, to implement the bi-directional GUI interface, multiple systems can communicate with each other to perform different tasks. In certain cases, these systems can be remotely located from each other and communicate by sending messages via a network. The messages may be HTTP messages or other internet protocol messages that enable the underlying computing devices to interpret and act on the message.

By generating/providing a bi-directional GUI interface, the system can enable a user to modify the query in a variety of ways, increasing productivity and improving the queries executed by the system. Further, the system can generate one or more action models that correspond to different commands of the query. The GUI can display action model summaries to improve the understandability of the query. In addition, the action model summaries can be interactive to enable indirect editing of the query. For example, an interaction with an action model summary can cause the system to determine modifications for the query and then implement those modifications without the user having to write code or understand the syntax of the underlying query language of the query. The system may also automatically run the query that is updated based on the user interactions with the action model summary. This can result in the system generating improved and more efficient queries that require less time to parse or that use fewer resources. In addition, this can reduce the number of queries executed by the system, and therefore the amount of compute resources used.

Figure 5:
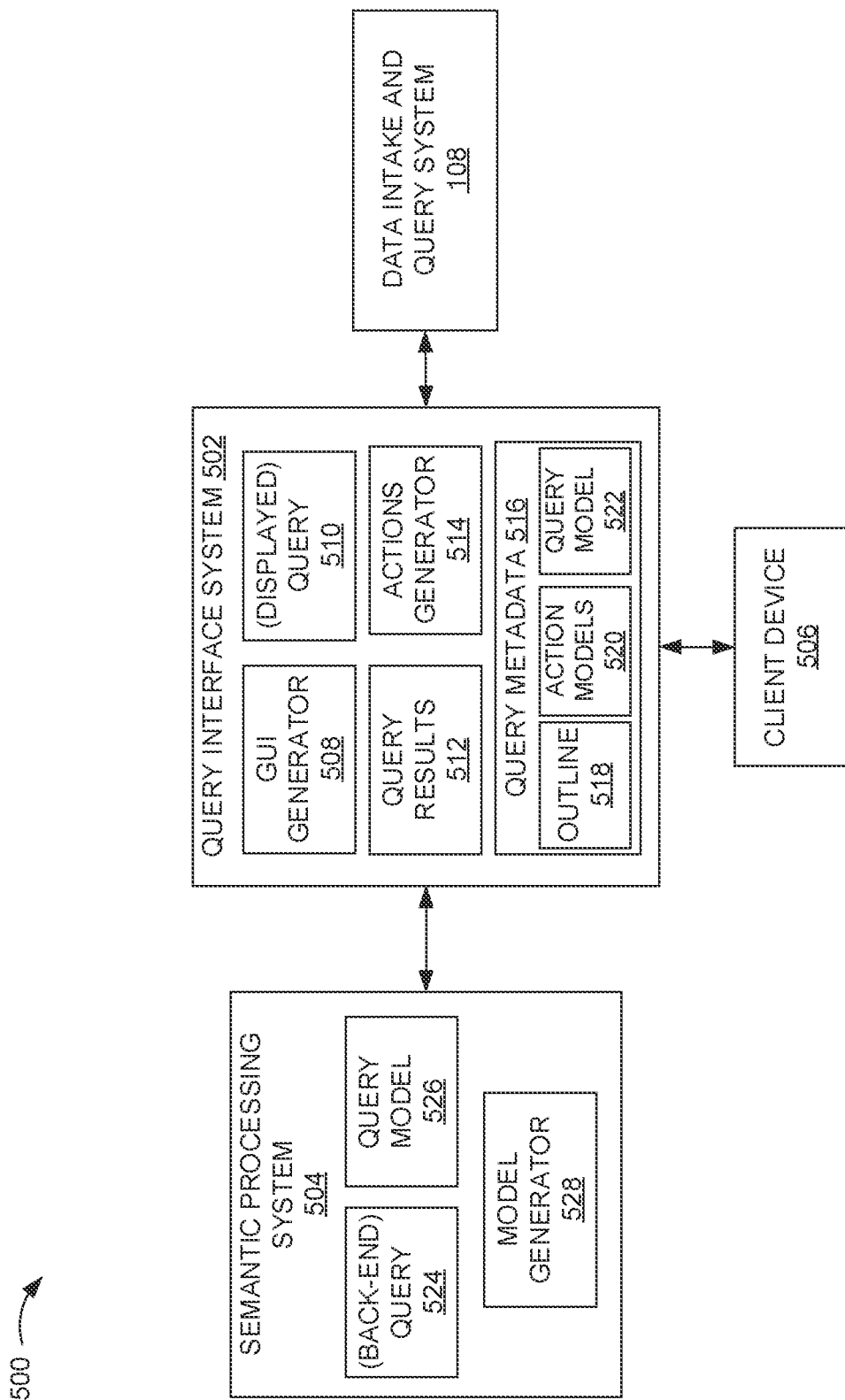
FIG. 5 is a block diagram of an embodiment of a user interface generation environment.

FIG. 5 is a block diagram of an embodiment of a user interface generation environment 500. In the illustrated embodiment, the environment 500 includes the data intake and query system 108, a query interface system 502, semantic processing system 504, and a client device 506. In some cases, the various systems can communicate with each other via one or more networks, such as a wide area network (e.g., the internet), local area network, etc. For example, the various systems may communicate using internet protocol (IP) messages, such as HTTP, that enable the underling computing devices to understand and act on the messages. In some cases, the systems may send hundreds, thousands, or millions of IP messages each minute, hour, or day, and the IP messages can cause the underlying computing devices to generate or modify data structures stored in non-transitory computer readable media, conduct distributed searches across multiple remotely located computing devices, modify graphical user interfaces displayed on a screen, etc.

In cases where one or more components, such as where the client device 506 and portions or all of the query interface system 502 or where the query interface system 502 and semantic processing system 504 are implemented on the same computing device, the corresponding components can communicate via a message bus. Similar to the IP messages, the messages sent via a message bus can use a computer protocol that enables the underlying computing devices to understand and act on the messages.

The query interface system 502, semantic processing system 504, and/or client device 506, may be implemented, without limitation, using one or more smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, the query interface system 502, semantic processing system 504, and/or client device 506 can include a hosted, virtualized, or containerized device, such as an isolated execution environment, that shares computing resources (e.g., processor, memory, etc.) of a particular machine with other isolated execution environments. The isolated execution environment can be configured to perform one or more functions of the query interface system 502, semantic processing system 504, and/or client device 506.

In the illustrated embodiment, the query interface system 502 includes a GUI generator 508 that can generate user interface data for rendering as a graphical user interface on the client device 506, an action model generator 514, and one or more data stores, RAM, or cache (generically referred to herein as "memory"). The memory can store a query 510 for display in the GUI (also referred to herein as the "display query 510" or "displayed query 510"), query results 512 received from the data intake and query system 108, and query metadata 516. It will be understood that the query interface system can include fewer or more components as desired. For example, although not illustrated, the query interface system 502 can include a query editor that enables editing of the displayed query 502 and/or a model generator 528.

In some cases, some, or all of the query interface system 502 can reside on the client device 506. For example, some or all of the query interface system 502 may be implemented as a client-side application, such as a web browser executing on one or more processors of the client device 506. In some such cases, the query 510, query results 512, and query metadata 516 can be stored in the cache of the browser.

In certain cases, the query interface system 502 can be implemented in a distributed fashion with some functions being performed at one location and other portions being performed at one or more different locations. For example, part of the query interface system 502, such as the GUI generator 508, can be implemented as a client-side application (e.g., on the client device), and other parts, such as the action model generator 514 and/or query editor, can be implemented as one or more server-side applications. In such cases, the different portions of the query interface system 502 can communicate via a network using one or more IP messages.

In some cases, the GUI generator 508 and action model generator 514 can be implemented using software modules, threads, or computer-executable instructions executing on one or more processors or in one or more isolated execution environments of the query interface system 502 (or client device 506).

The query model 522 can correspond to a query model generated by the semantic processing system 504. As described herein in greater detail, the semantic processing system 504 can use a version of the query 510 to generate a query model, and communicate the generated query model to the query interface system 502. The query interface system 502 can store the received query model as the query model 522 and/or use the received query model (or query model 522) to generate the query outline 518 and query action models 520.

The client device 506 can render the GUI for display and enable a user to interact with the GUI. As described herein, the GUI can include, in different areas of the GUI, a query panel to display the display query 510, an action models panel (also referred to herein as an actions panel) to display the query action models 520, a query outline panel to display the query outline 518, and a query results panel to display the query results 512 of the query 510 being executed by the data intake and query system 108. In some cases, within the query panel, a query editor can be implemented to enable a user to edit the displayed query 510.

As a user interacts with the various portions of the GUI (e.g., clicks on, hovers, selects, types, highlights, etc.), the query interface system 502 can communicate messages to the semantic processing system 504 and/or the data intake and query system 108. For example, if an interaction with the GUI indicates that a query is to be executed, the query interface system 502 can communicate the query to the data intake and query system 108 for execution, and the query results 512 can be displayed on the GUI.

In some cases, as a user edits the displayed query 510 or interacts with the action models 520 or query results 512, the query interface system 502 can send query modification messages to the semantic processing system 504. The semantic processing system 504 can process the query modification messages and respond with display modification messages. Based on the display modification messages, the query interface system 502 can, for example, edit the displayed query 510, edit the query model 522, generate updated action models 520 and/or an outline 518 and/or communicate the displayed query 510 to the data intake and query system 108 for execution. As described herein, the query modification messages and the display modification messages can be implemented as IP messages or other computer protocol messages that enable the underlying computing devices to receive, understand, and perform computer functions based on the messages.

In the illustrated example of FIG. 5, the semantic processing system 504 includes a model generator 528 and one or more data stores, RAM, or cache (generically referred to herein as "memory"). The memory can store a query 524 (also referred to herein as the back-end query 524) that is associated with the displayed query 510 and a query model 526. In certain cases, the semantic processing system 504 can be implemented in a distributed fashion with some functions being performed at one location and other portions being performed at one or more different locations.

In some cases, the displayed query 510 and back-end query 524 match or are identical. In certain cases, when the displayed query 510 and back-end query 524 do not match the semantic processing system 504 and the query interface system 502 communicate with each other to address any differences. As a non-limiting example, as described herein, edits or changes to the displayed query 510 can be propagated to the back-end query 524 and vice versa. In some such cases during the time in which the changes from the displayed query 510 are not yet reflected in the back-end query 524, the displayed query 510 and the back-end query 524 may be referred to as being out-of-sync. And when the displayed query 510 and the back-end query 524 match or are identical they can be referred to as being in-sync or synchronized.

The model generator 528 can be implemented using one or more software modules, threads, or applications executing on one or more processors or in one or more isolated execution environments of the semantic processing system 504. In some cases, the model generator 528 updates the back-end query 524 based on the query modification messages received from the query interface system 502. For example, a query modification message can indicate that a user has added a new command to the displayed query 510. In some such cases, the semantic processing system 504 can update the back-end query 524 with the change.

The manner in which the semantic processing system 504 updates the back-end query 524 can vary depending on the query modification message. For example, if the query modification message includes an indication of an edit to the displayed query 510, the semantic processing system 504 can update the back-end query 524 based on the edit. In certain cases, the semantic processing system 504 receives a complete copy of the updated version of the displayed query 510. In some such cases, the semantic processing system 504 can replace the back-end query 524 with the received updated version of the displayed query 510. In some cases, the semantic processing system 504 compares the received updated version with the back-end query 524 to determine the differences. Based on the differences, the semantic processing system 504 updates the back-end query 524.

In certain cases, the semantic processing system 504 may receive an instruction in a query modification message to edit the back-end query 524. These instructions may not correspond to changes to the displayed query 510. Rather, in some cases, the semantic processing system 504 can receive an instruction to edit the back-end query 524 before the displayed query 510 has been modified. In some such cases, the query modification message may be generated based on a user interaction with the action models 520 displayed in a GUI and/or a user interaction with the query results 512.

As a non-limiting example, based on a user interaction with certain query results, the query modification message may indicate that a particular command is to be added to a particular location of the query. Based on the query modification message, the semantic processing system 504 can update the back-end query 524.

As another example, the query modification message may include certain query parameters, such as a field identifier, field value, and associated action (e.g., "filter by") or command token (e.g., "where"). Based on the query modification message, the semantic processing system 504 can determine the command to be added (and its location) to the query. Based on the received information, the semantic processing system 504 can update the back-end query 524.

As described herein, the model generator 528 can generate a query model 526 based on the back-end query 524. In some cases, the query model 526 can be a parsed representation of the query that identifies the various parts of the query with metadata and/or identifiers. For example, the query model 526 can include identifiers for distinct system query parameters and user query parameters. In some cases, the query model 526 can include categorization information for the different query parameters. For example, the query model 526 can categorize system query parameters as command tokens, functions, grammar, clauses, Boolean operators, etc. and/or provide the type of a particular command token, such as streaming, generating, transforming, orchestrating and/or dataset processing, etc. In certain cases, the query model 526 is stored as a data structure and in a format that is more readily understood by a computing device. For example, the query model can be stored in a JSON format.

In addition, the query model 526 can include contextual information about the query, such as the location of particular query parameters within the query, location of commands within the query, location of grammar within the query, identification and location of related or groups of commands, etc.

In some cases, the query model 526 can include a command model that corresponds to one or more commands in the query or multiple commands that correspond to one command in the query. The command model can include references to system query parameters and user query parameters of a particular command(s) in the query or other characters in the query, as well as contextual information, such as the location of the system query parameters or user query parameters (or other characters) within the query or the location of the command within the query, etc.

The semantic processing system 504 can communicate updates to the back-end query 524 and/or query model 526 to the to the query interface system 502 via a display modification message. As described herein, the display modification message may include the entire back-end query 524 or just the changes to synchronize the displayed query 510 with the back-end query 524. Similarly, the display modification message may include the entire query model 526 or just the changes to synchronize the query model 522 with the query model 526. In addition, the display modification messages can provide instructions for the query interface system 502. For example, the display modification messages can include instructions to modify the displayed query 510, update the query model 522, generate an updated outline 518 and/or action models 520 based on the query model 526 or query model 522. Based on the display modification messages, the query interface system 502 can update the displayed query 510, outline 518, action models 520 and/or model 522.

In certain cases, based on an update to the displayed query 510 and/or the query metadata 516, the query interface system 502 can automatically communicate the displayed query 510 to the data intake and query system 108 for execution and can receive and display the query results 512 received from the data intake and query system 108.

Although described herein as being separate systems, in some cases one or more components of the semantic processing system 504 can be included with the query interface system 502. In certain cases, the functionality of the semantic processing system 504 can be implemented in the query interface system 502. For example, the query interface system 502 can generate a query model from the displayed query 510 and then use the query model 524 to generate the action models 520.

In certain cases, the semantic processing system 504 can be omitted. In some such cases, the query interface system 502 can generate the action models 520 based on the displayed query 510. For example, the action model generator 514 can use one or more rules or policies, similar to the rules or policies to identify the different query parameters and commands in the query and generate action models based on the query parameters and commands. As described herein, in some cases, one query command can result in one or more action models, or multiple query commands can result in one action model. Furthermore, as a user interacts with one of the displayed query 510, the query results 512, outline 518, and/or action models 520, the query interface system 502 can update the others, such as, by generating an updated query model 522, or directly updating the various components of the query interface system 502, etc.

Figure 6:
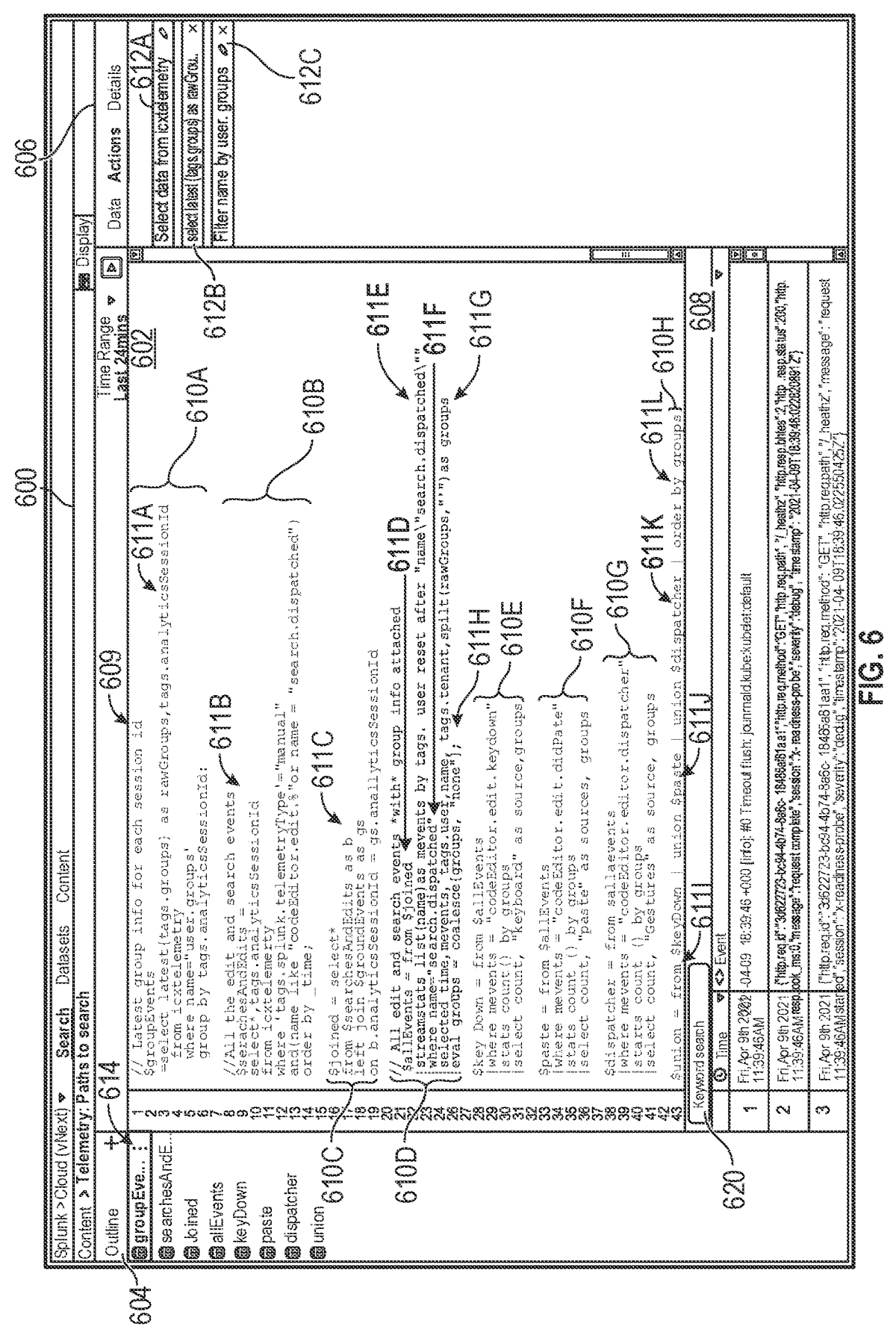

FIG. 6 is a non-limiting example of a GUI 600 that can be generated by the GUI generator 508 of the query interface system 502. In the illustrated example, the GUI 600 includes a query editor panel 602, actions panel 606, query outline panel 604, and query results panel 608 located in different areas of the GUI 600. The following description of FIG. 6 will also serve to illustrate examples of and the interplay between the various components of the environment 500.

The query editor panel 602 can enable a user to edit the query 609 (non-limiting example of the displayed query 510). In some cases, the underlying query editor of the query editor panel 602 can be implemented in a distributed fashion with one or more functions being performed locally on a client device 506 and one or more functions being performed remotely on a server. In certain cases, the query editor can be implemented using the opensource program Monaco Editor.

In the illustrated example of FIG. 6, the query 609 includes 43 lines of query parameters. Within the query 609, there are eight groups of commands 610A-610H (individually or collectively referred to as group of commands 610) identified as "groupEvents," "searchesAndEdits," "joined," "allEvents," "keyDown," "paste," "dispatcher," and "union," respectively. Each group of commands 610 is separated by an additional hard return and an identifier for the group of command 610. Each group of commands 610 can span multiple lines or be located on a single line. In the illustrated example, the group of commands 610H "union" is located on a single line, whereas the other groups of commands 610A-610G are located on multiple lines.

Further, each group of commands 610 includes at least one command (individually or collectively referred to as command(s) 611). The commands 611 in a query can be separated by a delimiter. In the illustrated example of GUI 600, the commands are separated by a '|."

The groups of commands 610A-610C include one command each, identified as commands 611A-611C, respectively, while the groups of commands 610D-610H include multiple commands. For example, the group of commands 610D "allEvents" has five commands 611D-611H and the group of commands 610H has four commands 611I-611L. Similar to the groups of commands 610, one command 611 can span one or more lines in a query or multiple commands 611 can be located on one query line. For example, the commands 611A-611C span multiple lines, whereas the commands 611I-611L are on a single line.

Each command 611 in a group of commands 610 has multiple query parameters. Generally speaking, the commands 611 of a query can be made up of different kinds of query parameters, including system query parameters and user query parameters. The system query parameters can refer to query parameters that are defined by the data intake and query system 108, such as command tokens (e.g., "from," "select," "where," "join," "streamstats," "stats," etc.), functions (e.g., "count," "average," etc.), clauses (e.g., "by," "order by," "group by" etc.), Boolean operators (e.g., "and," "or," etc.), command delimiters (e.g., '|' etc.) or query delimiters (e.g., ';' etc.) and/or query parameters that maintain their meaning across tenants. For example, the manner in which the data intake and query system 108 interprets "from," "|," "stats," "avg," and "by," is determined by the data intake and query system 108 and maintains its meaning across different users and tenants.

The user query parameters can refer to query parameters that are defined by the user or the user's data, such as the name of search terms in the query, the time range of the query, field names, keywords, dataset identifiers, etc. In some embodiments, the user query parameters are user or tenant specific such that a user query parameter for one user or tenant may have a different meaning (or no meaning at all) or apply to different data for another user or tenant. For example, even if two tenants have a "main" dataset, the data associated with the "main" dataset for one tenant is different from the data associated with the "main" dataset from the other tenant. Similarly, the data to which user query parameters correspond to can be based on the tenant's data, such as the data in a particular index and/or based on one or more regular expression rules for a particular sourcetype. As such, the same dataset identifiers may refer to different data for different datasets or for different tenant data. Accordingly, the meaning or what is referenced by the user query parameters can be user or data specific and may not be universally applicable to users of different tenants.

User query parameters and system query parameters can be further categorized based on type and subtypes. In some cases, the user query parameters can include query parameters of the types dataset, field, and keyword tokens, and the system query parameters can include query parameters of type functions and command tokens, clauses, Boolean operators, etc. Some system query parameters can include subtypes. For example, command tokens can include streaming command tokens (e.g., command tokens that operate on events as they are returned by a search, such as "append," "bin," or "join," "streamstats," etc.), generating command tokens (e.g., command tokens that generates events or reports from one or more dataset sources without transforming the events, such as "from," "tstats," etc.), transforming command tokens (e.g., command tokens that order results into a data table and transform specified cell values for each event into numerical values for statistical purposes, such as "stats," "table," "top," etc.), orchestrating command tokens (e.g., command tokens that control some aspect of how a search is processed, such as whether to enable search optimization, such as "lookup," "redistribute," etc.), and/or dataset processing command tokens (e.g., commands that use or require the entire dataset to run, such as "sort," "tail," etc.). In some cases, a command token may be part of multiple categories or be part of different categories depending on the mode or settings of the data intake and query system 108 or query. For example, in some cases, "bin," "append," and "join" may be streaming command tokens and/or dataset processing command tokens.

A combination of user query parameters and system query parameters can be used to form commands or query commands. For example, the query command 611I "from $keyDown" includes one system query parameter, "from," and one user query parameter "$keyDown." The system query parameter "from" can further be categorized as a "command word" or "command token" of the generating type and the user query parameter $keyDown can be further categorized as a dataset or dataset identifier. In this case the dataset "$keyDown" can correspond to the results output by the group of commands "keyDown".

With continued reference to FIG. 6, the query outline panel 604 can display a query outline 518 that corresponds to the displayed query 510 in the query editor panel 602. In the illustrated example of FIG. 6, the query outline panel 604 includes an outline 614 that corresponds to the query 609.

In some cases, the action model generator 514 can generate the outline 614. In certain cases, the action model generator 514 generates the outline 614 based on identifiers for groups of commands in the query 609 or identifiers in the query model 526. For example, as described herein, the query 609 includes eight identifiers for eight different groups of commands. As such, the model generator 528 can include the identifiers in the query model 526 for the query 609. The action model generator 514 can use the identifiers from the query model 526, the query 609 itself, or some other identifier for each group of commands, to create the outline 614.

In some cases, the GUI 600 can enable a user to interact with the outline 614 to change what is displayed in the GUI. For example, in the illustrated example of FIG. 6, "groupEvents" is selected from the outline 604. As such, the "groupEvents" group of commands is shown at the top of the query editor panel 602. In addition, actions summaries 612A-612C associated with the commands in the "groupEvents" group of commands are shown in the actions panel 606. Selecting a different identifier within the outline 614 can cause the query editor to scroll down to that group of commands. In addition, depending on the selected group of commands the actions panel 506 can display the action models associated with the group of commands.

For example, selecting "union" from the outline 614 would cause the query editor to scroll down so that the "union" group of commands is displayed at the top of the query editor panel 602. Similarly, the actions panel 606 would be updated to show action summaries associated with the "union" group of commands.

In some cases, the GUI 600 can enable the user to use the outline 614 to modify the query 609. For example, the GUI 600 can enable the user to delete the "keyDown" group of commands by interacting with the "keyDown" identifier in the outline 614. Based on the interaction, the query interface system 502 can send a query modification message to the semantic processing system 504 instructing the semantic processing system 504 to delete the "keyDown" group of commands. Based on the query modification message, the semantic processing system 504 can remove the "keyDown" group of commands from the back-end query 524, generate an updated query model 526, and communicate a display modification message to the query interface system 502 that includes the changes to the back-end query 524 and updated query model 526. The query interface system 502 can use the received changes and updates to modify the displayed query 609, re-generate any action models 520 (and summaries) associated with the modified query 609, and update the outline 518.

Similarly, the GUI 600 may enable a user to move groups of commands to different locations within the query editor using the outline 614 (518) (or actions panel 606), perform other query edits, etc. As with other changes, the query interface system 502 can send a query modification message to the semantic processing system 504. The semantic processing system 504 can process the query modification message and respond with a display modification message. The query interface system 502 can use the display modification message to update the displayed query 609 (510), action models 520, and the outline 614 (518).

The actions panel 606 can display summaries of the action models 520 generated by the action model generator 514. In addition, the actions panel 606 can enable a user to modify the action models summaries and underlying action models 520. For example, the actions panel 606 can enable a user to delete, edit the content of, or rearrange action models summaries, which may result in changes to the underlying action models 520.

In the illustrated example of FIG. 6, the actions panel 606 displays the action models summaries 612A-612C (non-limiting examples of summaries of the action models 520) corresponding to the selected group of command lines (the "groupEvents" group of commands). It will be understood that the actions panel 606 can include fewer or more action model summaries 612A-612C (individually or collectively referred to as action model summaries 612). In some cases, the actions panel 606 can display all of the action model summaries corresponding to the query 609.

The query results panel 608 can display one or more query results 512 received from the data intake and query system 108. In the illustrated example of FIG. 6, the results panel 608 includes three events. Each event includes a timestamp and machine data or raw machine data. In some cases, the results 512 can be referred to as interactive query results given that a user can interact with the query results 512 to update the query 609 and/or action model summaries 612.

The query results panel 608 includes a keyword search field 620 that enables a user to enter keywords that can be used to filter the query results 608. In some cases, entering a keyword into the keyword search field 620 causes an update to the query 609 (e.g., query interface system 502 communicates the keyword to the semantic processing system 504, which updates the back-end query 524 and/or generates an updated query model 526 and sends back a display modification message to the query interface system 602 to update the query 609 and/or actions panel summaries 612). In certain cases, entering the keyword into the keyword search field 620 does not result in any updates to the query 609. For example, the query results 512 may be stored in a browser cache and the keyword may be used to filter those results without sending a new query to the data intake and query system 108, whereas updating the query 609 may result in the updated query being sent to the data intake and query system for execution.

Although not displayed in FIG. 6, it will be understood that the GUI 600 can include fewer or more panels or components. In some cases, the GUI 600 can include additional query results based on additional queries generated by the query interface system 502. In certain cases, based on the identification of a particular dataset within the query 510, the query interface system 502 can generate one or more additional queries to obtain data about the dataset.

For example, the query interface system 502 can generate a query to identify field identifiers for fields in the dataset or keywords in the dataset, etc. The results of these additional queries can be displayed on the GUI 600 to enable the user to add additional query parameters to the query. Based on interactions with the additional query results, additional query parameters can be added to the query. In certain cases, the additional query parameters can be added by the query interface system 502 communicating a query modification message similar to the query modification message generated in response to interactions with the query results 512 to the semantic processing system 504, receiving edits for the displayed query 510, and updated the displayed query based on the received edits. In addition, as described herein the query interface system 502 can receive an updated query model, generate action models based on the query model and update the action model summaries based on the action models.

5.1. Query Models and Action Models

As described herein, the query 609, which is an example of a displayed query 510, can include various types of system query parameters, user query parameters, commands, groups of commands, etc. Similarly, the back-end query 524 can include various query parameters.

With reference to FIGS. 5 and 6, in certain cases, the query 609 and/or a back-end query 524 that corresponds to the query 609 can be used to generate a query model (e.g., query model 522, 526). The generated query model can be used to generate the action models summaries 612 displayed in the actions panel 606.

5.1.1. Query Models

As described herein, the query model 526 can be generated by the semantic processing system 504 based on the back-end query 524 and/or the query modification messages received from the query interface system 502. For example, once the back-end query 524 is updated in response to a query modification message, the semantic processing system 504 can generate the query model 526 based on the updated back-end query 524. In some cases, each time the back-end query 524 is updated, the semantic processing system 504 can generate an updated query model 526. In certain cases, the semantic processing system 504 can update the back-end query 524 and query model 526 concurrently. For example, based on a query modification message, the semantic processing system 504 can determine that a command is to be added to the back-end query 524. As the semantic processing system 504 updates the back-end query 524 with the command, it can concurrently generate a command model that corresponds to the command and add the command model to the query model 526.

To generate the query model 526, the model generator 528 can parse the back-end query 524, or in some cases, the displayed query 510 (e.g., query 609)(generically referred to as the query 510). As it parses the query 510, the model generator 528 can identify and/or categorize different query parameters of the query 510. For example, the query model can identify and/or categorize different system query parameters and user query parameters. In addition, the model generator 528 can identify related commands or groups of commands. As the model generator 528 parses the query 510, it can generate the query model 526.

The query model 526 can include a parsed representation of the query 510. In some cases, the query model 526 can be in a JSON format. For example, the query model 526 can include symbols or representations for the various query parameters, as well as contextual information, such as the location of different query parameters within the query.

In some cases, the query model 526 can include command models that correspond to or are generate from the command of the query. In certain cases, a command model can include a reference or otherwise identify, the command(s) or portion of a command to which it corresponds. The command model may include an identifier for system query parameters (e.g., command tokens, functions, grammar, etc.) and/or user query parameters within the query command that corresponds to the command model. In some cases, the command model may also include categorization information for the different query parameters of the command. For example, the command model may indicate what the type of a command token in the command or the type of a user query parameter. The command model may also indicate the placement of each system query parameter and user query parameter within the command and the placement of the command within the query.

In some cases, each command in the query can have a corresponding command model in the query model. With reference to query 609, a corresponding query model may have twenty-four command models or more (or fewer). In some such cases, the model generator 528 can identify each command based on a command delimiter (e.g., '|') and generate a command model for each command.

In certain cases, the query model may include a command model for only some of the commands in the query. For example, the query model may include a command model for system query parameters of a particular type (e.g., command tokens) or subtype (e.g., streaming commands), etc. In some cases, the model generator 528 can use a lookup table or other data structure to determine whether to generate a command model for a particular command. The lookup table can indicate what should be included in a command model for each system query parameter. For example, the lookup table can indicate that for the command token "WHERE" a new command model should be created. Similarly, the lookup table can indicate that the clause "group by," should be included as part of a current command model (e.g., the command model that is being edited/created). In other words, the lookup table can indicate that no new command model should be created for the clause "group by." Similarly, the model generator 528 can include rules and policies for each system query parameter. In certain cases, the model generator 528 can include rules or policies for system query parameters based on their type or subtype. These rules or policies may indicate that the model generator 528 is to create a new command model for some system query parameter, include certain system query parameters as part of a command model of another system query parameter (e.g., the system query parameter that (immediately) precedes it or (immediately) follows it), or generate a new command model for a particular system query parameter based on its location within the query and based on which query parameters precede it or follow it. Accordingly, the model generator 528 can use different policies and rules to generate command models for the commands in the query.

In some cases, the model generator 528 can use different policies and rules to generate command models based on the type or subtype of a query parameter. For example, the model generator 528 may include a rule that user query parameters are to be included as part of a current command model (e.g., do not create a new command model when a user query parameter is encountered as the query is parsed). However, it will be understood that the model generator 528 can use different rules or policies to create command models as desired. For example, the model generator may include a rule to sometimes or always create a new command model for a user query parameter. The rule may indicate that the model generator 528 should create a new command model for a user query parameter based on its location within a command or within the query.

As another example in which the model generator 528 can use different policies or rules to generate command models, in certain cases, the model generator 528 may include a rule that each command token should be part of its own command model or that clauses are always part of the same command model as the command token that (immediately) precedes the clause in the query. As another example, the model generator 528 may include a rule that certain command tokens are to be part of their own command model, while others are to be part of the command model of a command token that (immediately) precedes it or (immediately) follows it. In some cases, the model generator 528 can make this determination based on a specific command token and/or based on types of command tokens.

Accordingly, when building the query model 526, the query generator 528 can identify a command in the query and determine whether it should generate one or more command models for the command or whether it should generate one command model from multiple commands.

In certain cases, one command model can correspond to multiple commands in the query or multiple command models can correspond to one command in the query. For example, if the query uses multiple commands to perform a particular action, such as to generate a trend line, the model generator 528 may generate a single command model for the multiple commands. In some cases, to generate one command model from multiple commands, the semantic processing system 504 can analyze the combination of commands to determine if they perform a particular action. For example, the semantic processing system can compare the combination of commands with known patterns of commands that result in the particular action. If the combination of commands matches the known pattern, the semantic processing system can determine that one command model should be generated from the combination of commands.

As another example, if a command in the query is relatively complicated, includes a Boolean operator, or can be factored into multiple parts (e.g., could have been written as distinct commands), the model generator 528 may generate multiple command models for the single command. For example, for the command "WHERE sourcetype='kube' AND host='app_default_pool'" the model generator 528 can determine that based on the presence of the Boolean operator "AND," the command could have been written as two separate commands (e.g., "WHERE sourcetype='kube'" and "WHERE host='app_default_pool',"). Accordingly, the model generator 528 can generate two command models for the command (e.g., a command model for filtering data based on the source "kube" and a second command model for filtering data based on the host "app_default_pool."). In some cases, the model generator 528 can include a rule or policy to not factor commands into multiple command models or it may include a rule or policy to sometimes factor commands into multiple command models for some system query parameters, but not for others. Again, these rules may apply to individual system query parameters or based on a type or subtype of the relevant system query parameter or user query parameter.

In some cases, the model generator 528 can include a rule or policy that a new command model based on the presence of a command delimiter. For example, for each 'I' in the query 609, the model generator 528 can create a new command model. Thus, in some cases, where the model generator 528 may not have created a new command model based on a system query parameter, the presence of the command delimiter may make the system query parameters part of a new command model. For example, consider the command 611L "order by groups." The command 611L includes the system query parameter "order by," which is a clause, and a user query parameter "groups" and is immediately preceded by the system query parameter '|,' which is a command delimiter. Based on the clause "order by," the model generator 528 may determine no new command model is to be created, however, because the command delimiter '|' immediately precedes (excluding spaces) the clause "order by," the model generator 528 can create a new command model for the command. In contrast, with reference to the "groupEvents" command 611A "select latest (tags.groups) as rawGroups, tags.analyticsSessionID from icxtelemetry where name='user.groups' group by tags.analyticsSessionId;" the model generator 528 may not create a new command model for the clause "group by" because there is not a command delimiter that immediately precedes it.

With continued reference to the command 611A, the model generator 528 can create multiple command models. For example, in the illustrated example, the model generator 528 created command model for each of the command tokens "select," "from," and "where" within the command 611A. Accordingly, the model generator 528 can generate command models based on the type and/or subtype of a query parameter and its location within the query.

In certain cases, the query model 526 can include identifiers for related commands or groups of command. For example, with reference to FIG. 6, the query 609 includes eight groups of commands 610A-610H, identified as "groupEvents," "searchesAndEdits," "joined," "allEvents," "keyDown," "paste," "dispatcher," and "union," respectively. Accordingly, a query model for the query 609 can include an identifier for each of the distinct groups of commands.

5.1.2. Action Models

With continued reference to FIGS. 5 and 6, The query model 526 can be used to generate the action models displayed in the actions panel 606 (although reference is made to the query model 526 being used to generate action models, it will be understood that the query model 522 may be used). The relationship between the query model and action models can be similar to the relationship between the query and the query model in that the action model generator 514 can parse the query model to generate the action models 520. In some cases, such as where the query model 526 is stored as a parsed representation of the query (e.g., as a data structure and/or in a format that is more readily interpreted by a computing device, such as a JSON format), parsing the query model 526 may be relatively easier than parsing the query.

Accordingly, the action model generator 514 can use the structure and/or metadata of the query model 526 to generate a query actions model, which can be made up of individual action models to generate. In some cases, the action model generator 514 can generate an action model for each command model. For example, if the rules and policies of the model generator 528 and action model generator 514 are similar in terms of how different parts of the query are to be parsed and interpreted, the action model generator 514 can generate an action model for each command model.

In certain cases, the action model generator 514 can generate multiple action models from one command model or combine multiple command models as one action model. For example, similar to the way in which the model generator 528 uses rules and policies to determine whether to generate one or multiple command models from one command or to generate one command model from multiple commands, the action model generator 514 can use rules and policies to determine whether to generate one or multiple action models from one command model or to generate one action model from multiple command models.

As a non-limiting example, the action model generator 514 can identify command models that perform multiple actions and create multiple action models from the command model, or the action model generator 514 can determine that a particular sequence of command models performs a particular action and generate an action model for the sequence of command models. Similar to the model generator 528, the action model generator 514 can identify the sequence of commands using pattern matching. For example, the action model generator 514 can compare command tokens from the sequence of command models with known patterns of command tokens that perform different actions. If the command tokens in the sequence of command models matches a known pattern, the action model generator 514 can generate an action model from the sequence of command models.

In some cases, the rules and policies of the model generator 528 and action model generator 514 may diverge. For example, where the rules and policies of the model generator 528 may be focused on creating a data structure with granular information about each query parameter that is more readily understood by a computing device, the action model generator 514 may be focused on creating a data structure with a summary that is more readily understood by a human. Accordingly, the model generator 528 may break down the query into as many command models as possible to aid a computing device in understanding the query 524, whereas the action model generator 514 may seek to combine command models in a way that aids a human in understanding the actions that will occur as a result of the query 510.

In certain cases, the generation of the command model can be relatively simple in that the model generator 528 can generate a command model for each command, without attempting to perform higher-level parsing tasks, such as splitting commands into multiple command models or combining commands into one command model. In some such cases, the action model generator 514 can perform the higher-level tasks by splitting command models and/or combining command models. In certain cases, these higher-level functions can be split between the semantic processing system 504 and query interface system 502. For example, the semantic processing system 504 can split commands into multiple command models and the query interface system 502 can combine commands into multiple action models (e.g., by combining command models of the query model that correspond to the commands).

Although the model generator 528 and action model generator 514 may have a different purpose and therefore use different rules and polices, the action model generator 514 can use similar mechanisms to generate the action models. For example, action model generator 514 can create action models based on the type/subtype of query parameters and/or context (location of the query parameters within the command/query; location of command within the query). Accordingly, the action model generator 514 may treat system query parameters of the same type/subtype a similar way and/or include rules for particular system query parameters. In addition, the action model generator 514 can use contextual information to determine how to generate action models from the query model 526.

In some cases, each action model can be linked to or reference the command models of the query model (or commands of the query) used to generate the action model. In addition, the action model can include a short statement or summary of the action that occurs as a result of the relevant query command. The summary can identify the relevant command token and/or summarize the process that is being performed on the data based on the associated query command(s). For example, the summary can identify the system query parameter that initiates the action (e.g., the command token or another term that summarizes what the command token is intended to do) and the user query parameter that identifies the object (or data) on which the action is to be performed. In certain cases, the summary can provide a description of an action that results from execution of the query commands that correspond to or are associated with the action model. The GUI 600 can display the statement or summary of the action model in the actions panel. In some cases, reference to the displaying an action model 522 can refer to the display of the summary of the action model.

As a non-limiting example and with reference to actions panel 606 of FIG. 6, three action model summaries 612A, 612B, 612C are shown. These action model summaries 612A, 612B, 612C correspond to the "groupEvents" command 611A in lines 3-6 of the query 609. As described herein, the model generator 528 may have broken the "groupEvents" command into three command models (e.g., a command model for each command token "select," "from," and "where"). The action model generator 514, in this example, created the three action models 612A, 612B, 612C from the generated command models. Thus, action model 612A corresponds to the portion of the "groupEvents" command on line 3 ("select latest(tags.groups) as rawGroups, tags.analyticsSessionID"), action model 612B corresponds to the portion of the "groupEvents" command on line 4 ("from icxtelemetry"), and action model 612C corresponds to the portion of the "groupEvents" command on lines 5 and 6 ("where name='user.groups' group by tags.analyticsSessionId").

As described herein, the action models can include reference to the command models used to generate the actions models and/or reference to the commands used to generate the command models that are used to generate the action models. As shown in FIG. 6, the action model summaries 612A-612C can include a brief description of the action performed by the corresponding portions of the command 611A. For example, the action model summary 612A ("Select data from icxtelemetry") identifies the action (select data from) that will result from the command token (from) and identifies the dataset (icxtelemetry) on which the action will be performed. Similarly, the action model summary 612C ("Filter name by user.groups") identifies the action (filter by) that will result from the command token (where) and identifies the data (events with the field-value "user.groups" for the field "name") on which the action will be performed.

Notably, the action model summaries 612A, 612C can be more than a mere recitation of the command or command token. Rather, the action model summaries 612A, 612C can include a synopsis of the command token in a more human-comprehensible form. Put another way, the action model summaries 612A, 612C use different terms for some of the query parameters found in the corresponding command 611A. In certain cases, the action model summary can include the same terms as the corresponding command or a subset of the same terms without adding different terms.

As described herein, interacting with action model summaries 612 can result in updates to the displayed query 510. For example, deleting the action model summary 612A can result in the deletion of the command(s) or portion of the command that correspond to the action model summary 612A.

If the action model summary corresponds to a portion of a command in the query, then when the action model summary is deleted, that portion of the command can be deleted from the query. Similarly, if the action model corresponds to multiple commands in the query, then when the action model is deleted, all of the commands that correspond to the action model summary can also be deleted.

In some cases, the corresponding command(s) or portion of a command in the query are deleted based on the query interface system 502 sending query modification message to the semantic processing system 504 that identifies the changes to be made, the semantic processing system 504 updating the back-end query 524 and sending edits to the query interface system 502 to update the query 510 to reflect the changes made to the back-end query, and the query interface system 502 using the edits to delete the corresponding commands from the query 510.

In addition, rearranging the query action model summaries 612A-612C can result in the corresponding commands to be moved or rearranged. For example, with reference to FIG. 7C, based on a user moving the query action model summary 712D to between query action model summaries 712B and 712C, the query interface system 502 can generate a query modification message indicating the change and send the generated query modification message to the semantic processing system 504. The semantic processing system 504 can use the query modification message to update the back-end query 524, generate an updated query model 526, and communicate the relevant edits for the query 709B (510) to the query interface system 502 via a display modification message. The query interface system 502 can update the query 510/709B based on the display modification message.

In certain cases, the query interface system 502 may disable the rearranging of the action model summaries 612A-612C if such a rearrangement would create an error in the query (e.g., an error in the query language used to form the query).

Given the various combinations of one or more commands being used to generate one or more command models and one or more command models being used to generate one or more action models and action model summaries, it will be understood that there may be many different types of relationships between commands, command models, and action models/action model summaries as summarized by the following table, where "1" indicates one command, one command model, or one action model and "multiple" indicates multiple commands, multiple command models or multiple action models. Thus, the second row indicates that one command can result in one command model in the query model, which can result in one action model in the query actions model, whereas the fifth row indicates that one command can result in multiple command models and multiple action models.

TABLE 1

| Number of Commands | Number of Command Models | Number of Action Models |
|---|---|---|
| 1 | 1 | 1 |
| 1 | 1 | Multiple |
| 1 | Multiple | 1 |
| 1 | Multiple | Multiple |
| Multiple | 1 | 1 |
| Multiple | 1 | Multiple |
| Multiple | Multiple | 1 |
| Multiple | Multiple | Multiple |

As described herein command models may reference the commands from which they were generated. Similarly, action models may reference the command models and/or commands from which they were generated. Accordingly, in instances where one action model results from multiple commands (or command models), the action model can reference or be associated with the multiple commands (or command models). In instances where one command (or command models) corresponds to one action model, the action model can reference or be associated with the one command (or command models). Similarly, in instances where multiple action models result from one command (or command model), each action model can reference the command (or command model) and may also reference the particular portion of the command (or command model) from which the action model was generated.

In some cases, the action models may not reference the commands with which they are associated. In some such cases, an action model can reference the command model(s) or portion thereof used to generate the action model, and the command model can reference the command(s) or portion thereof used to generate the command model. In this way the query interface system 502 and/or semantic processing system 504 can identify relationships between action models (and summaries) and commands in the query.

Using the references and/or associations between action models, command models and commands, the query interface system 502 can determine, based on a modification to an action model summary, which command(s) are affected, and communicate an appropriate query modification message to the semantic processing system 504 that identifies the relevant commands and the changes to be made to the commands.

For example, if an action model summary associated with a portion of a command is edited, the query interface system 502 can use the relationships between action models, command models, and commands to identify the portion of the command that is to be edited and include that information in the query modification message. Similarly, if an action model summary associated with multiple commands is deleted, the query interface system 502 can use the relationships between action models, command models, and commands to identify the commands that are to be deleted and include that information in the query modification message.

In some cases, editing one action model summary can affect multiple commands, some of which may not have an indicated relationship with the action model. For example, editing an action model can transform a corresponding command in the query. Other commands in the query may have referred to and/or relied on the transformed command. In some such cases, the model generator 528 can use its knowledge of the query language to modify the other commands and generate an updated query model 526. The action model generator 514 can generate updated action models 520 based on the updated query model 526. Although described as being performed by the model generator 528, it will be understood that a component of the query interface system 502 could perform a similar modification to a query and send an updated query to the semantic processing system 504 as part of a query modification message. In some such cases, the model generator 528 can generate an updated query model 526 based on the query modification message.

As a non-limiting example, consider the following query: $q=from main|rename a as b|where b=1. If an action model summary corresponding to "rename a as b" is deleted, a query modification message identifying the chang can be communicated to the semantic processing system 504. Based on the change, the model generator 528 can determine that the command "where b=1" will be affected because it includes reference to "b." As such, the model generator 528 can revise the command "where b=1" to "where a=1" resulting in the following query "$q=from main|where a=1." The model generator 528 can then generate a query model 526 based on the updated query. As mentioned, it will be understood that a component of the query interface system 502 could perform a similar modification to the query and send the updated query ($q=from main|where a=1) to the semantic processing system 504 as part of a query modification message.

5.2. Example User Interfaces

To illustrate the interactions between the query interface system 502 and the semantic processing system 504, consider the following non-limiting examples in reference to FIGS. 7A-7D and 8A-8D in which 1) an interaction with one or more query results causes the displayed query 510 and action model summaries to be updated, 2) an interaction with one or more action model summaries causes the query 510 to be updated, and 3) edits to the displayed query 510 causes the action model summaries to be updated.

Figure 7A:
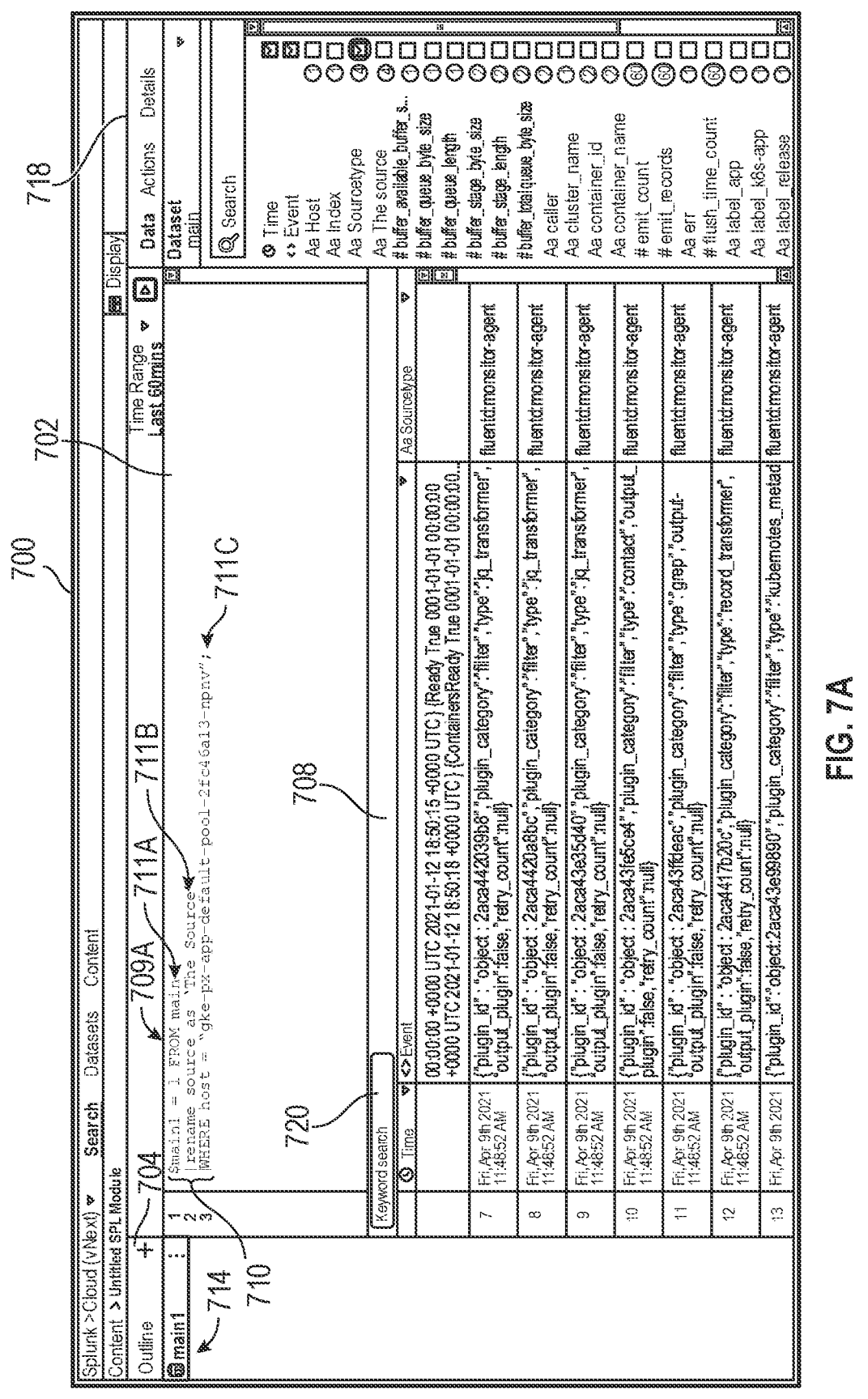
Figure 7B:
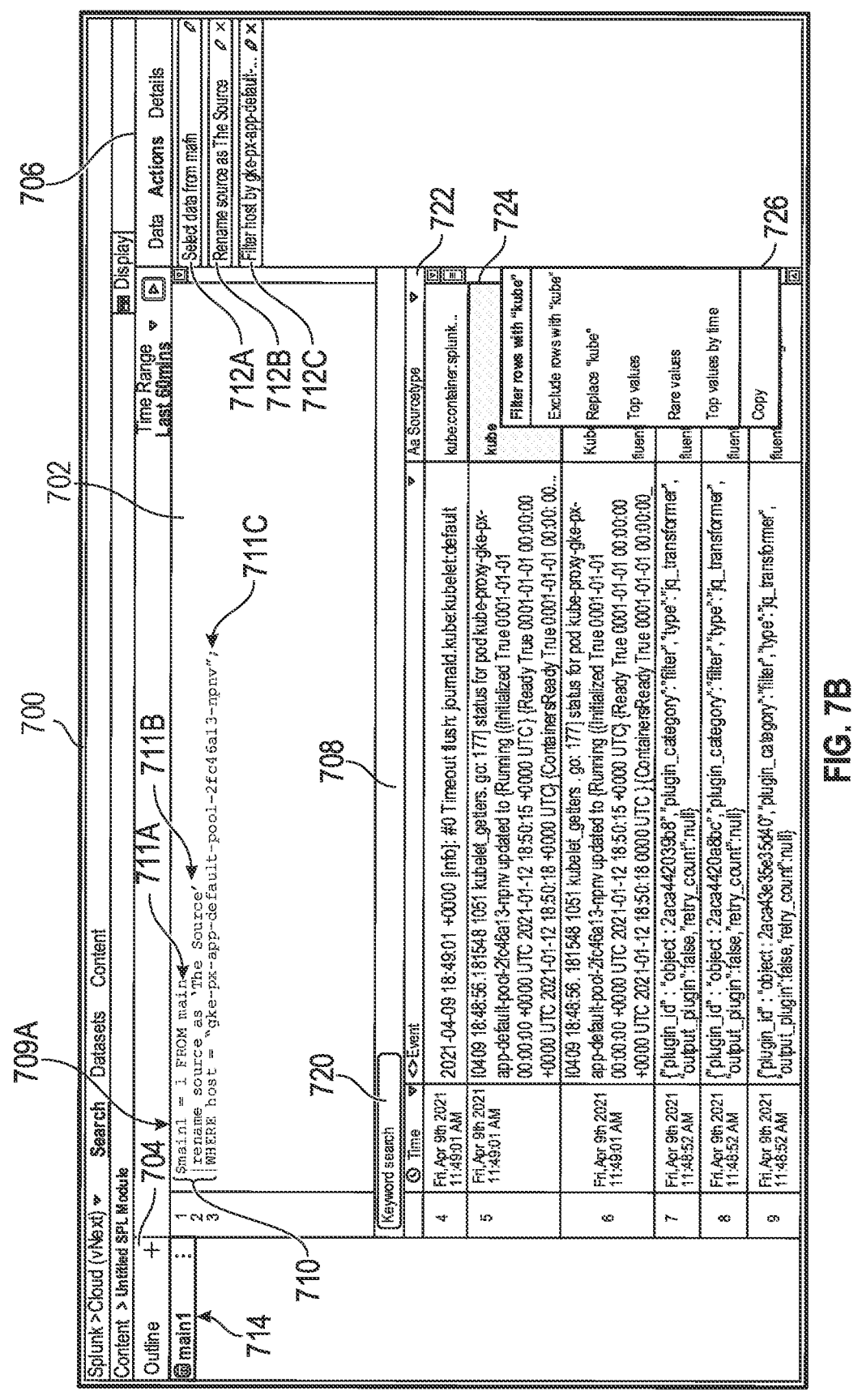
Figure 7C:
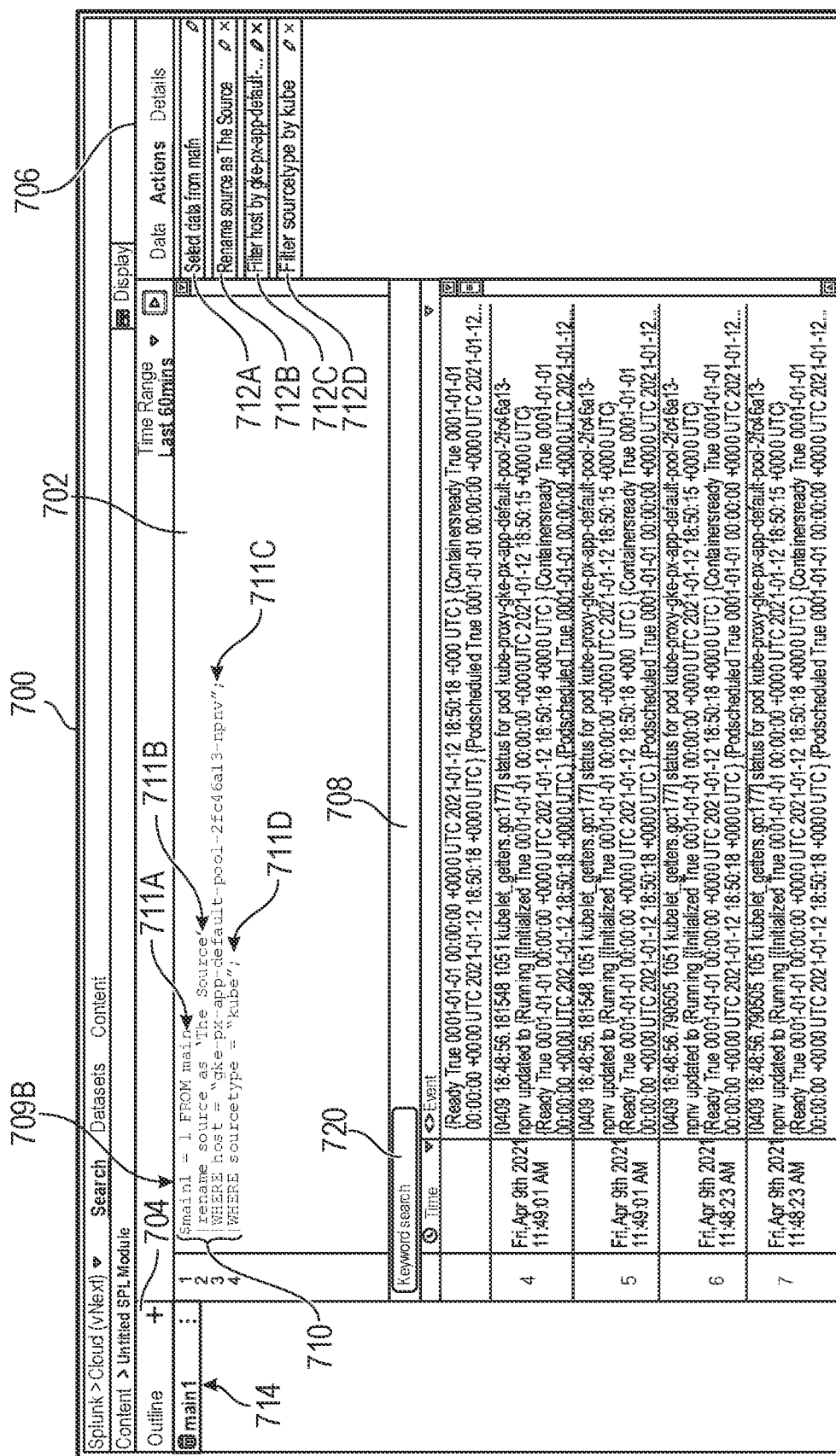
Figure 7D:
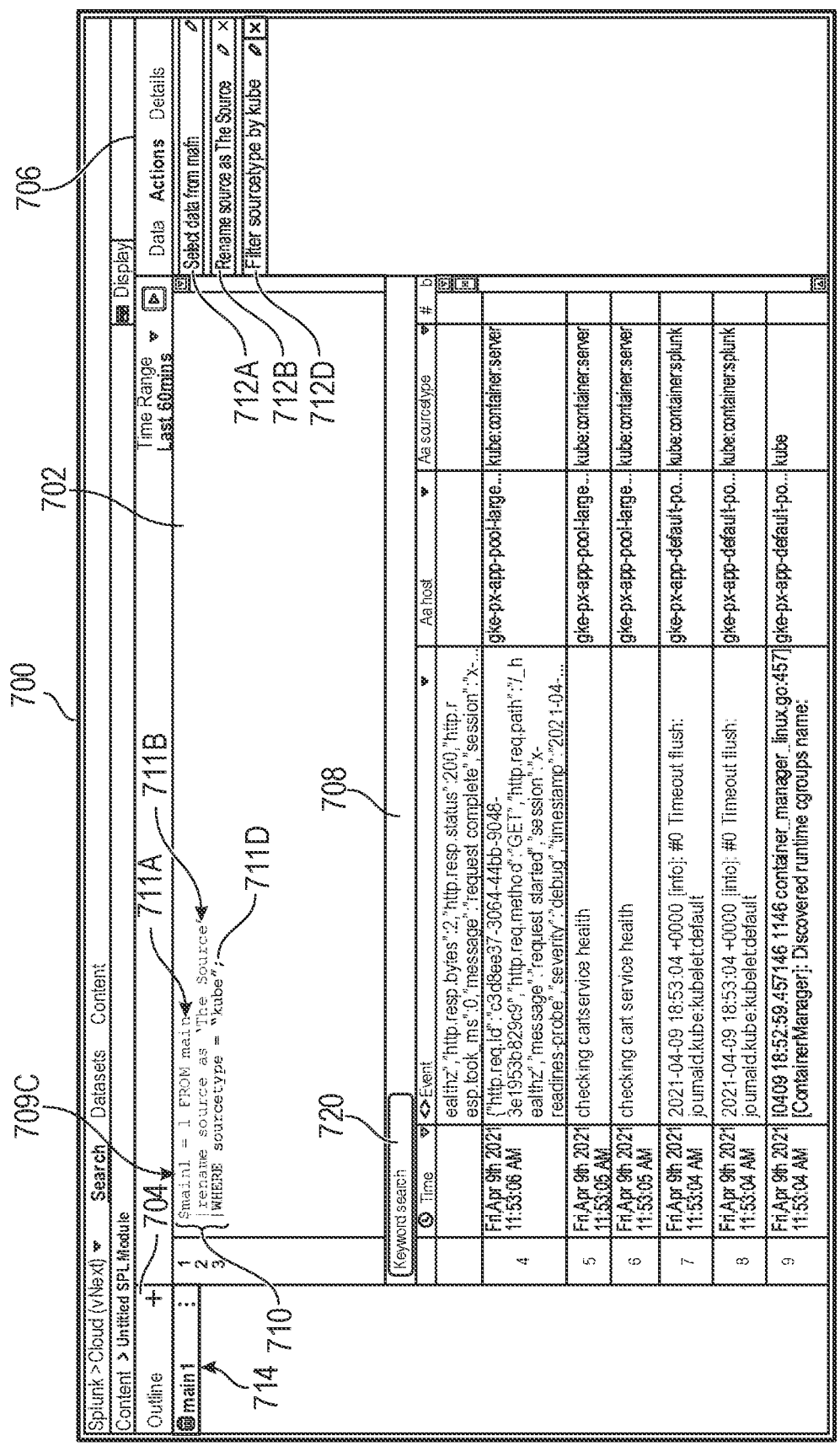

FIG. 7A illustrates an example of a GUI 700. The GUI 700 can be similar to GUI 600 in that it includes a query editor panel 702, outline panel 704, and query results panel 708 with a keyword search field 720). The GUI 700 illustrated in FIG. 7A differs, in some respects from GUI 700 in that it includes a data panel 718 in place of an actions panel. However, based on a user interaction, the GUI 700 can display an actions panel 706, as illustrated in FIGS. 7B-7D. In addition, the GUI 700 displays a different query 709A (non-limiting example of the displayed query 510) than the GUI 600. Specifically, the query 709A includes one group of commands 710 "main1," which has three commands 711A-711C separated by the delimiters '|.' Accordingly, the outline 714 is different from the outline 614 as are the action model summaries 712A-712C (shown in FIG. 7B), which correspond to the commands 711A-711C, respectively.

In certain cases, the data panel 718 can be filled based on one or more queries executed by the data intake and query system 108. The queries can be different from the query 709A and can be generated by the query interface system 502 and/or data intake and query system 108. In some cases, the queries can include query parameters to identify additional information about datasets identified in the query 709A. For example, one additional query may instruct the data intake and query system 108 to identify some (e.g., most common, most rare, top 10, etc.) or all of the fields within the dataset "main." Another additional query may instruct the data intake and query system 108 to identify some (e.g., most common, most rare, top 10, etc.) or all keywords found within the dataset "main." Yet other queries may instruct the data intake and query system 108 to calculate averages, sums, or other information about the dataset "main." For example, a query can request the dataset to provide the number of different fields in the dataset "main."

In some cases, interactions with the data panel 718 can result in the query results 708 being updated. For example, based on the selection of the field "sourcetype" in the data panel, the query results are updated to show the field value for the sourcetype field in the various events. Similar to adding keywords to the keyword search field 720, adding fields via the data panel 718 may or may not cause an update to the query 709A. For example, in some cases, adding a field via the data panel 718 may cause the query results panel 708 to merely update the manner in which the query results are displayed, such as, by showing an additional field of an event. In certain cases, interactions with the data panel 718 can cause the query 709A to be updated. For example, based on an interaction with a result from the additional queries, the query interface system 502 can generate a query modification message and update the query 709A and action model summaries 712, similar to the way in which the query interface system does when a user interacts with the query results 512.

FIG. 7B illustrates an example of the GUI 700 in which the actions panel 706 has been selected for display. Accordingly, action model summaries 712A-712C (non-limiting examples of summaries of the action models 520) are displayed. As described herein, the action model summaries 712A-712C can correspond to commands in the query 709A. For example, the action model summary 712A can correspond to the command "FROM main," the action model summary 712B can correspond to the command "rename source as 'The Source,'" and the action model summary 712C can correspond to the command "WHERE host='gke-ox-app-default-pool-2fc46a13-npnv.'"

In addition, a user has interacted with the query results displayed in the query results panel 708, for example, by clicking on the "sourcetype" field (column) 722, hovering over "kube" in the first pop-up window 724, and then hovering over and clicking the display object associate with "Filter rows with 'kube'" in the second pop-up window 726.

Based on this interaction, the query interface system 502 can determine that the corresponding query results 512 should be filtered based on the selected field value (sourcetype="kube") and generate and communicate a query modification message to the semantic processing system 504. The instructions can be based on the display object selected within the second pop-up window. For example, each display object can be associated with a different command or action, and the query interface system 502 can determine what action is to take place (and therefore what command or parameters to send to the semantic processing system 504) based on the selected display object.

In some cases, the query modification message can include a command line that is to be added to the back-end query 524 and displayed query 709A. For example, the query modification message can include the command "WHERE sourcetype='kube'" with an instruction that it should be added to the end of the back-end query 524 that corresponds to the displayed query 709A.

In certain cases, the query modification message can include certain parameters based on the interaction. For example, the query modification message may (only) include parameters for the relevant command and corresponding field(s), and field value(s), such as "filter, sourcetype, kube." In some such cases, the semantic processing system 504 can determine the exact query parameters or command to add to the back-end query 524 and displayed query 709A. Accordingly, in some cases, the query interface system 502 is unaware of the edits that will be made to the displayed query 510 based on a user's interaction with the query results 512. Furthermore, in certain, the back-end query 524 can be updated before the displayed query 510. In some such cases, the back-end query 524 can include the most current version of the query and the displayed query can include an outdated version of the query (until it is updated) in response to a display modification message.

The semantic processing system 504 can process the query modification message. In this example, as part of processing the query modification message, the semantic processing system 504 can update the back-end query 524 to include a command corresponding to "Filter rows with 'kube,'" generate a query model 526 based on the updated back-end query 524 and respond to the query interface system 502 with a display modification message.

FIG. 7C is a diagram illustrating an example GUI 700 showing the results after the query interface system 502 has processed the display modification message. Specifically, the display modification message can include edits for the displayed query 709A, and an updated query model 524. The query interface system 502 can use the edits to update the displayed query 709A to become displayed query 709B, initiate execution of the updated query 709B, and display the updated query results in the query results panel 708. In addition, the query interface system 502 can use the updated query model 524 to generate an updated query actions model and update the action model summaries 712A-712D.

The edits for the query can correspond to the command that is to be added to the displayed query 709A. In this example, the edits for the query can include an instruction to add "WHERE sourcetype='kube'" to the displayed query 709A. Depending on where the command is to be added, the display modification message can include additional edits to the query 709A. For example, the display modification message can indicate grammatical changes (e.g., the addition of a delimiter, such as '|' before or after the command to be added), rearranging or modification of existing query command lines, etc. In certain cases, the display modification message can include a replacement query that is to replace the query 709A. For example, rather than providing the query interface system 502 with the differences between the updated and now current back-end query 524, the semantic monitoring system 504 can provide query interface system 502 with the entire query and instruct the query interface system 502 to replace the displayed query with the received query. As a result of processing the display modification message, the query interface system 502 can display an updated query 709B that includes a new command 711D "|WHERE sourcetype='kube'" at the end.

The display modification message may, in some cases, instruct the query interface system 502 to execute the updated query. In certain cases, the query interface system 502 can automatically execute the updated query based on a determination that the query has changed. In some cases, the query interface system 502 can wait for a user interaction instructing it to execute the query. The GUI 700 can display the results of the updated query 709B in the query results panel 708.

As described herein, the query interface system 502 can use the received query model 526 to generate an updated outline 518 and/or updated action models 520. In the illustrated example of FIG. 7C, the added command 711D "WHERE sourcetype='kube'" resulted in a new action model and a corresponding action model summary 712D being displayed in the actions panel 706.

Similar to the way in which a user interaction with the query results displayed in the query results panel 708 result in an updated query 709B and a new action model summary 712D, user interactions with the actions panel 706 or action model summaries 712A-712D can result in updates to the query 709B.

FIG. 7C illustrates an example of user interaction with the action model summary 712C. Specifically, a user clicks the 'X' proximate the action model summary 712C. Based on this interaction, the query interface system 502 can determine that the command 711C, which corresponds to action model summary 712C, should be deleted from the query 709B. Accordingly, the query interface system 502 can generate and communicate a query modification message to the semantic processing system 504 to delete the command 711C from the back-end query that corresponds to the query 709B.

In some cases, the query modification message can include a copy of the command 711C that is to be deleted. For example, the query modification message can include the command 711C "WHERE host='gke-ox-app-default-pool-2fc46a13-npnv.'" with an instruction that it should be added to the end of the back-end query 524 that corresponds to the displayed query 709A. In certain cases, the query modification can also include any grammar or delimiters that are to be deleted, such as the '|' before the command 711C.

In certain cases, the query modification message can include certain parameters based on the interaction. For example, the query modification message may (only) include parameters for the relevant command to be deleted, such as "delete, filter, host, gke-ox-app-default-pool-2fc46a13-npnv)." In some cases, the query modification message can include an identifier for the command 711C or its corresponding command model(s). For example, as the action model summary 712C is generated from one or more command models, which in turn were generated from the command 711C, the query modification message can include an identifier for the command models used to generate it and/or an identifier for the command 711C. In some cases, the query interface system 502 can include a lookup table or other data structure that tracks the relationship between query commands, command models, and action models. In some such cases, the query system 502 can use the lookup table or reference thereto to identify the command 711C for deletion in the query modification message.

In certain cases, the semantic processing system 504 can determine the query parameters or command to delete from the back-end query 524 and displayed query 709A based on the identifiers received via the query modification message. Accordingly, in some cases, the query interface system 502 is unaware of the edits that will be made to the displayed query 510 based on a user's interaction with the actions panel 706. Furthermore, in certain cases, the back-end query 524 can be updated before the displayed query 510. In some such cases, the back-end query 524 can include the most current version of the query and the displayed query can include an outdated version of the query (until it is updated).

The semantic processing system 504 can process the query modification message. In this example, as part of processing the query modification message, the semantic processing system 504 can update the back-end query 524, generate a query model 526 based on the updated back-end query 524, and respond to the query interface system 502 with a display modification message.

FIG. 7D is a diagram illustrating an example GUI 700 showing the results of the query interface system 502 processing the display modification message. Specifically, the display modification message can include edits for the query 709B and an updated query model 524. The query interface system 502 can use the edits to update the query 709B to query 709C, update the action model summaries 712A-712D to remove action model summary 712C, initiate execution of the updated query 709C, and display the updated query results in the query results panel 708.

FIGS. 8A-8D illustrate an example of the GUI 700 with a different query 809A (non-limiting example of the displayed query 510). Specifically, the query 809A includes one group of commands 810 "main1," which has three commands 811A-811C separated by the delimiters '|.' Accordingly, the outline 814 is different from the outlines 614, 714 as are the action model summaries 812A-812C (non-limiting examples of summaries of the action models 520), which correspond to the commands 811A-811C, respectively.

Figure 8A:
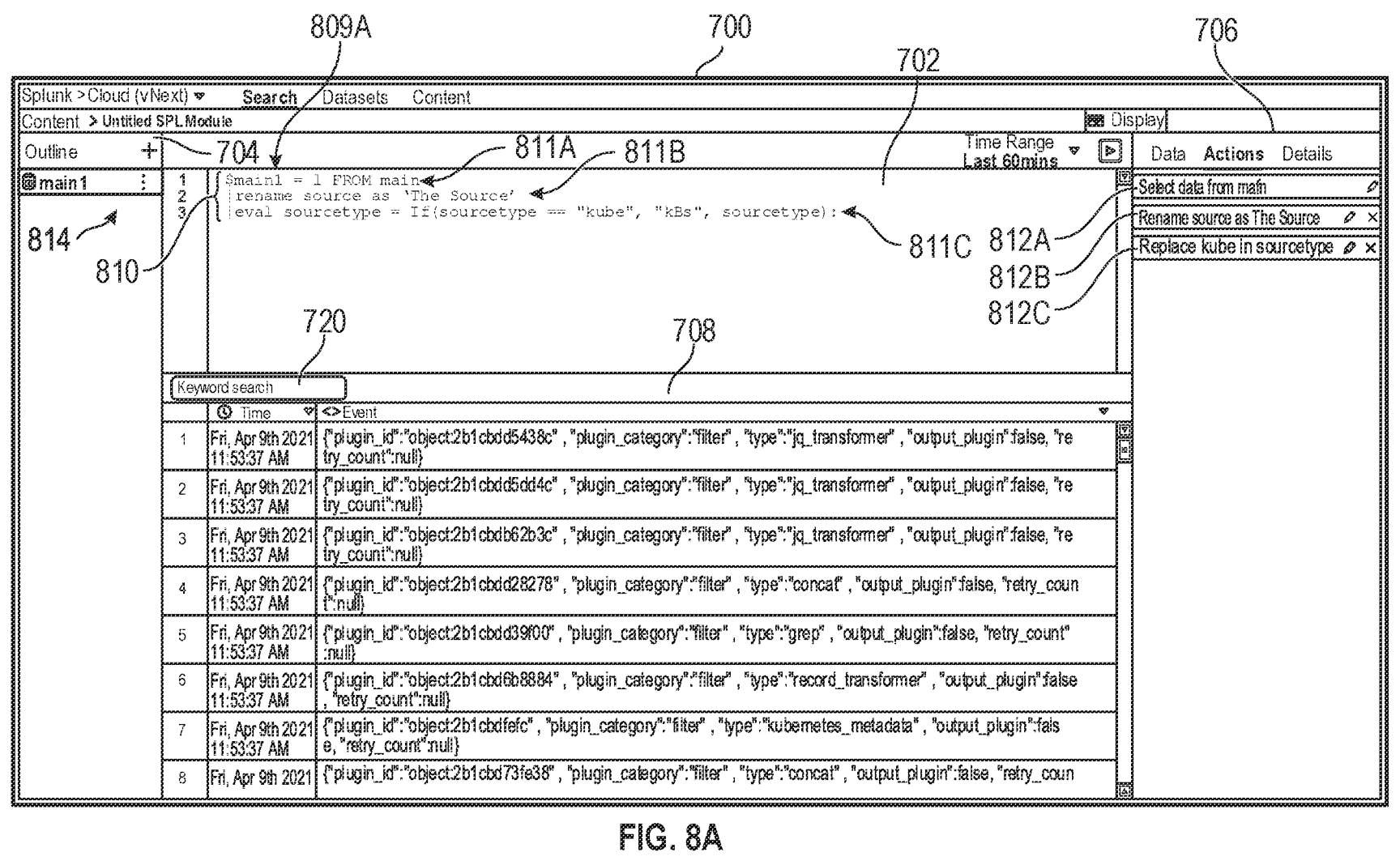
Figure 8B:
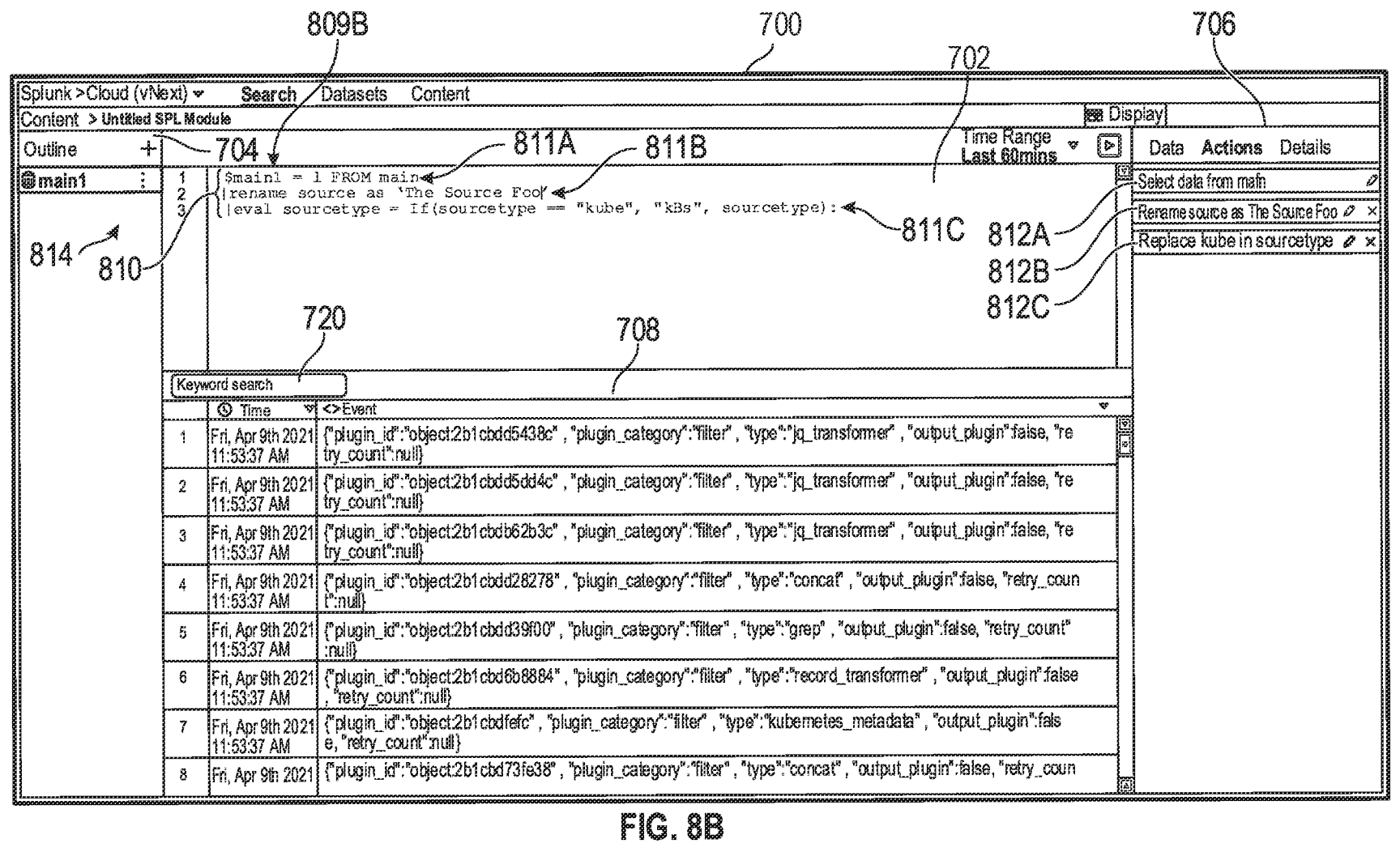

FIGS. 8A and 8B illustrate an example of the results of a user interacting with and/or editing the query 809A, which results in updates to the actions panel 706 and/or action model summaries 812A-812C. Specifically, a user edits the command 811B "rename source as "The Source" to read "rename source as "The Source Foo." The query interface system 502 can update the query as it is being edited, which results in query 809B (shown in FIG. 8B). In addition, based on the detected change, the query interface system 502 can generate and communicate a query modification message to the semantic processing system 504 to modify the back-end query 524 that corresponds to the query 809B.

In some cases, as the query 809A was directly edited, the query modification message can include the changes made to the query 809A and/or the complete query 809B. The semantic processing system 504 can process the query modification message. In this example, as part of processing the query modification message, the semantic processing system 504 can update the back-end query 524, generate a query model 526 based on the updated back-end query 524, and respond to the query interface system 502 with a display modification message.

As the query 809A has been updated to query 809B, the display modification message may not include any changes for the query 809B, however, the display modification message may include an updated query model 526. As described herein, the query interface system 502 can use the updated query model 526 to update the outline 814 and/or the actions panel 706. As shown in FIG. 8B, the action model summary 812B is updated to reflect that the source has been renamed "The Source Foo."

Figure 8C:
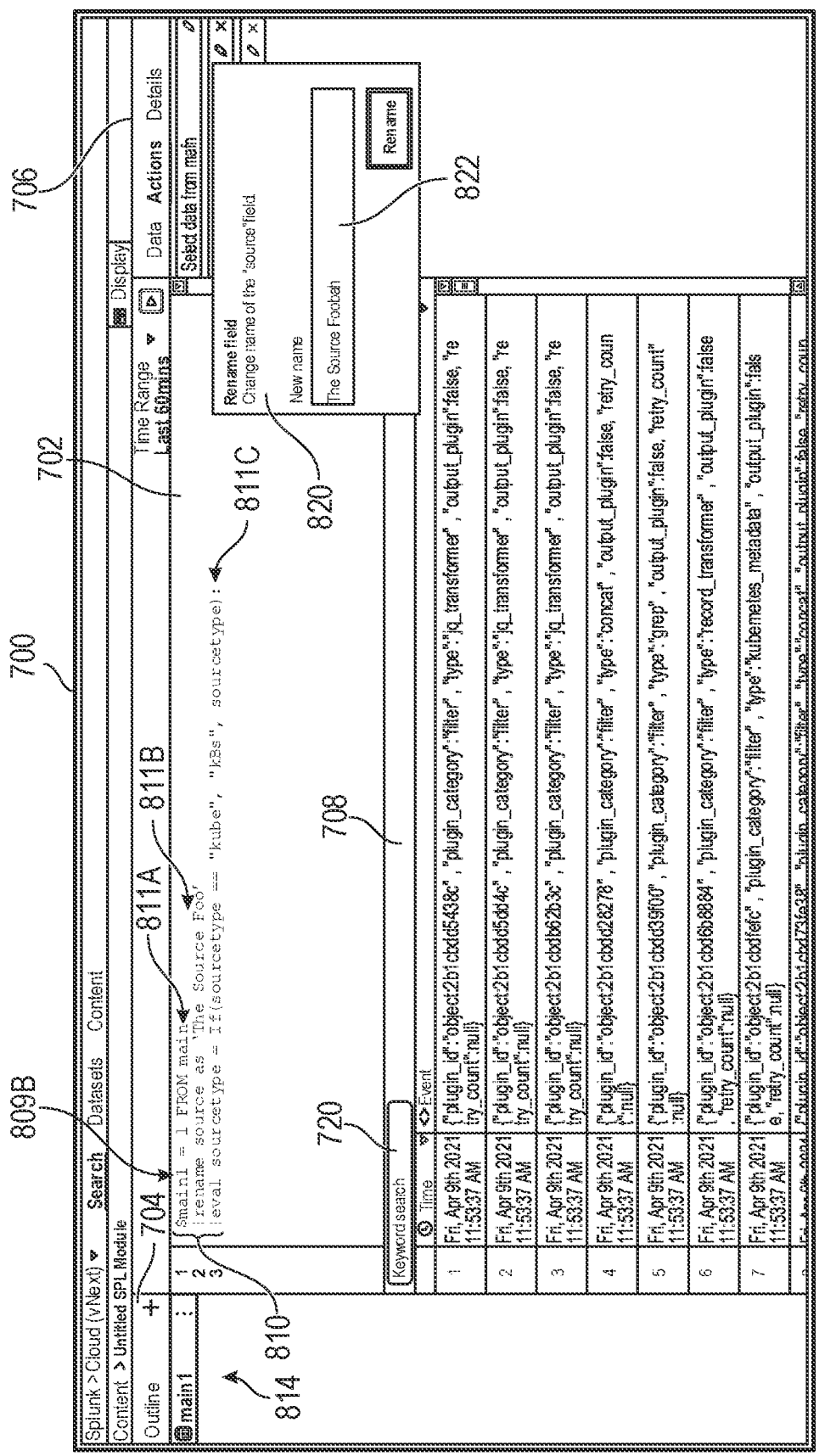
Figure 8D:
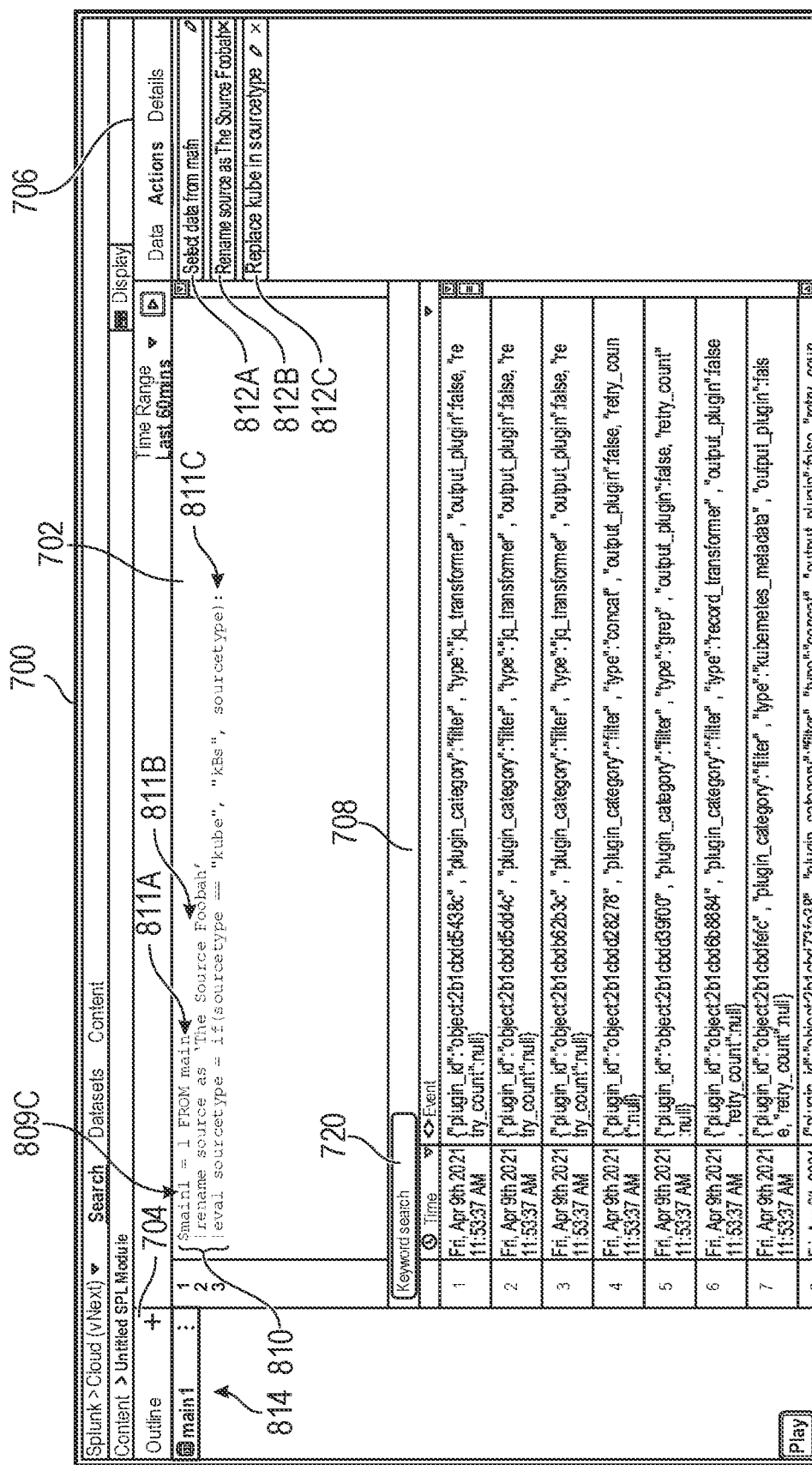

As described herein, changes to the actions panel can be reflected in the query. FIGS. 8C and 8D illustrate an example of changes made to the query 809B based on a user interaction with the actions panel 706. Specifically, a user has clicked on an icon indicating they would like to modify the action model summary 812B, which results in the pop-up box 820 being displayed with the new name field 822. The user has entered "The Source Foobah" as the new name for the "source" field in the new name field 822.

Based on this interaction, the query interface system 502 can update the action model summary 812B with the new name and generate and communicate a query modification message to the semantic processing system 504 to modify the back-end query 524. As described herein, the query modification message can include a copy of the command to be inserted in the query 809B, or parameters that can be used by the semantic processing system 504 to generate the command.

The semantic processing system 504 can process the query modification message. In this example, as part of processing the query modification message, the semantic processing system 504 can update the back-end query 524, generate a query model 526 based on the updated back-end query 524, and respond to the query interface system 502 with a display modification message.

FIG. 8D is a diagram illustrating an example of the GUI 800 showing the results of the query interface system 502 processing the display modification message. Specifically, the display modification message can include edits for the query 709B but may not include an updated query model 526 given that the query interface system 502 may have already edited the actions panel 706. The query interface system 502 can use the query edits to update the query 809B to query 809C, initiate execution of the updated query 809C, and display the updated query results in the query results panel 708.

In some cases, in response the interaction with the with the action panel 706, the query interface system 502 may not update the action model summary 811B. Instead, it may wait to update the action model summary 811B until it receives an updated query model from the semantic processing and generates and updated actions model based on the updated query model. In this way, the query interface system 502 can use a similar process path to update the action model summary 811B as with other updates.

5.3. Flow Diagrams

Figure 9:
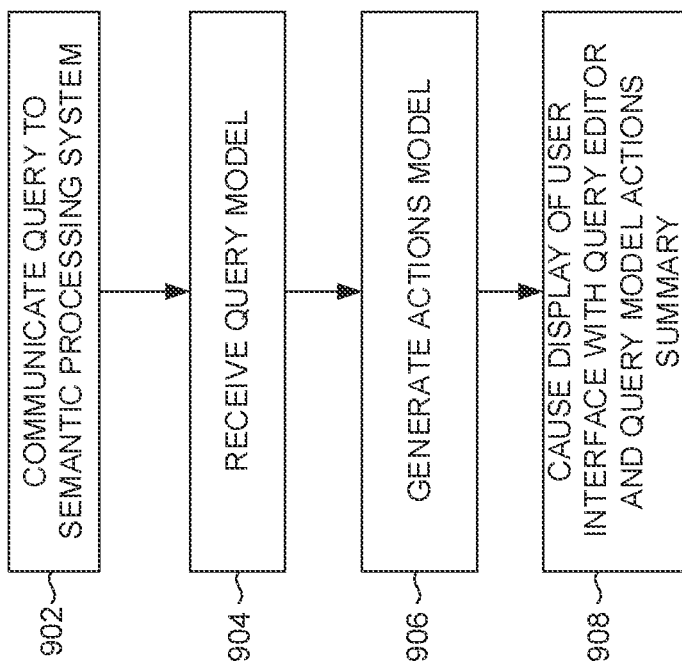
FIG. 9 is a flow diagram illustrating an embodiment of a routine implemented by the query interface system to generate and display a query actions model.

FIG. 9 is a flow diagram illustrating an embodiment of a routine 900 implemented by the query interface system 502 to generate and display a query actions model. The data flow illustrated in FIG. 9 is provided for illustrative purposes only. It will be understood that one or more of the steps of the processes illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 902, the query interface system 502 communicates a query 510 to a semantic processing system 504. In some cases, such as when the query interface system 502 and semantic processing system 504 are implemented on distinct computing devices, the query interface system 502 can communicate the query over a network via one or more query modification messages.

As described herein, the query interface system 502 can communicate the query 510 to the semantic processing system 504 based on an edit to the query 510, such as the addition of a new query in a query editor or a change to an existing query in a query editor. In some cases, the query interface system 502 can communicate the query 510 to the semantic processing system 504 at predetermined time intervals, based on detected changes, and/or based on a user interaction. For example, in certain cases, the query interface system 502 can communicate the query 510 to the semantic processing system 504 based on a received request to execute the query. In some such cases, the query interface system 502 can communicate the query 510 to the semantic processing system 504 for parsing/processing and communicate the query 510 to the data intake and query system 108 for execution.

In response to receiving the query 510, the semantic processing system 504 can create and/or update a back-end query 524 and generate a query model 526. As described herein, the query interface system 502 and semantic processing system 504 can communicate with each other to maintain the query 510 and the back-end query 524 in-sync with each other. Accordingly, the semantic processing system 504 can create and/or update the back-end query 524 to match the query 510.

The semantic processing system 504 can also generate and/or update a query model 526 based on, or using, the back-end query 524 or the received query 510. The semantic processing system 504 can include information regarding the various system query parameters that can be found in the query 524. The information can include how the system query parameters interact with each other, what types of user query parameters follow particular system query parameters, syntax requirements of system query parameters (e.g., syntax requirements of command tokens, functions, or clauses, etc.), etc. Using this information, the semantic processing system 504 can generate the query model 524 as a parsed representation, such as a symbol tree or source model, of the query in a computer-readable format, such as JSON.

As described herein, the semantic processing system 504 can generate command models, or parsed representations of query commands for the query model. The command model can identify the system query parameters and user query parameters of a particular command, the placement of the query parameters within the command, the underlying process or action that the command is to perform and the data on which the command is to be performed, etc. In some cases, the semantic processing system 504 can generate one command model for each command in the query.

In certain cases, the semantic processing system 504 can generate one command model from multiple commands or multiple command models from one command. For example, the semantic processing system 504 can use pattern recognition to determine if multiple commands are used to complete a particular task or action. If multiple commands match a known pattern, the semantic processing system 504 can generate one command model from the commands.

As another example, the semantic processing system 504 can determine whether a particular command can be broken down into, or rewritten as, multiple commands. For example, the presence of a Boolean operator or a string of different command tokens that are not separated by a command delimiter may indicate that a command can be broken down into multipole commands. In some such cases, the semantic processing system 504 can generate multiple command models from a single command.

The query model 526 can also include contextual information about the query, query comments, and identifiers for groups of commands. For example, the query model 526 can include location information of the commands relative to each other in the query, an indication of language in the query that represents comments and is not used to execute the query, and identifiers associated with different groups of commands.

At block 904, the query interface system 502 receives the query model 526 from the semantic processing system 504. As described herein, the query model 526 can be a parsed representation of the back-end query 524 and can include command models that correspond to the commands of the back-end query 524. In some cases, the query interface system 502 receives the query model 526 via a display modification message.

At block 906, the query interface system 502 generates an actions model. The actions model can include individual action models that correspond to the command models of the query model. A particular action model can include a reference to the command model(s) used to create it as well as a summary of the action performed by the query command(s) that corresponds to the action model. In some cases, the summary can identify the system query parameter that initiates the action (e.g., the command token or another term that summarizes what the command token is intended to do) and the user query parameter that identifies the object on which the action is to be performed.

As described herein, the query interface system 502 can generate the action models from the command models similar to the way in which the semantic processing system 504 generates command models from commands. For example, the query interface system 502 can generate one or multiple action models from one command model or generate one action model from multiple command models. For example, the query interface system 502 can identify a command model that perform multiple actions and create multiple action models from the command model, or the query interface system 502 can determine that a particular sequence of command models performs a particular action and generate an action model for the sequence of command models.

In addition, as described herein, the higher-level tasks of splitting a command or joining commands can be performed by the query interface system 502, the semantic processing system 504, or a combination of the query interface system 502 and semantic processing system 504. For example, the semantic processing system 504 can split commands into multiple command models and the query interface system 502 can combine commands into multiple action models (e.g., by combining command models of the query model that correspond to the commands). As another example, the semantic processing system 504 can perform the splitting and joining of commands in command models, in which case, the query interface system 502 may be able to generate an action model for each command model without regard to potentially splitting or joining command models together to form multiple action model or a single command model, respectively.

At block 906, the query interface system 502 causes display of a user interface with action model summaries. As described herein, in some cases, the user interface can include a panel to display the action model summaries. Furthermore, as described herein the action model summaries can be interactive action model summaries. For example, as described herein, the user interface can enable a user to delete, edit, and/or rearrange action model summaries.

As mentioned, the routine 900 can be modified in a variety of ways. Although not shown in FIG. 9, it will be understood that the query interface system 502 can perform additional functions using the query model 526. For example, the query interface system 502 can generate an outline 518 using the query model 526. The outline 518 can be different from the actions models 520. For example, the outline 518 can include a header for each group of commands and/or include an identifier for each command. In certain cases, the outline 518 does not enable a user to modify its content directly. Rather the outline 518 can be a reflection of the content of the query without attempting to describe the content in a different or more human-comprehensible way. However, it will be understood that, in some cases, the outline 518 can be used to edit the query 510 and/or actions models 520 as described herein.

FIG. 10 is a flow diagram illustrating an embodiment of a routine 1000 implemented by the query interface system 502 to update one or more panels of a user interface based on a user interaction with another panel. The data flow illustrated in FIG. 10 is provided for illustrative purposes only. It will be understood that one or more of the steps of the processes illustrated in FIG. 10 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used. Furthermore, it will be understood that any one or any combination of the functions described herein with respect to routine 1000 can be combined with the functions or blocks described herein with reference to routine 900. In some cases, routine 900 can represent the initial generation of a user interface and routine 1000 can represent the updates made to the user interface as the user interacts with it.

At block 1002, the query interface system 502 generates a query modification message based on a detected interaction with the user interface. As described herein, a user can interact with the GUI in a variety of ways. For example, the user can edit a displayed query 510, edit action models 520 via action model summaries, and/or interact with the query results 512. Based on a detected interaction or change, the query interface system 502 can generate a query modification message.

The content of the query modification message can depend on the interaction. For example, as described herein, if the user edits the displayed query 510, the query modification message can include a copy of the query and/or the changes to the query. As another example, if the user edits the query action summaries or interacts with the query results 512, the query modification message can include an instruction to modify the displayed query 510 by adding, removing or changing one or more commands in the query 510. As described herein, the instruction can include a verbatim copy of the command to be added, removed, or changed, and/or the instruction can include certain parameters, such as the type of command, affected dataset, etc., to enable the semantic processing system 504 to generate the command.

At block 1004, the query interface system 502 communicates the query modification message to the semantic processing system 504. In some cases, such as when the query interface system 502 and semantic processing system 504 are implemented on distinct computing devices, the query interface system 502 can communicate the query modification message via a network using one or more IP messages.

In response to receiving the query modification message, the semantic processing system 504 can update a back-end query 524 and generate a query model 526. As described herein, the query interface system 502 and semantic processing system 504 can communicate with each other to maintain the query 510 and the back-end query 524 in-sync with each other. Accordingly, the semantic processing system 504 can update the back-end query 524 to match the query 510.

As described herein, at least with reference to block 902 of FIG. 9, the semantic processing system 504 can also generate and/or update a query model 526 based on, or using, the back-end query 524 or the received query 510. The query model 526 can include command models that correspond to commands in the back-end query 524 and/or contextual information about the query.

At block 1006, the query interface system 502 receives a display modification message. The content of the display modification message can depend on the query modification message. For example, if the query modification message included a command to modify the query, the display modification message can include edits for the query 510 and a query model. As described herein, the edits may include a replacement query to replace the query 510 and/or instructions to edit certain parts of the query, such as to add, modify, or delete a particular command from the query. As another example, if the query modification message indicated that the query had been edited, the display modification message may include the query model 526 but omit the back-end query 524 or any changes to be made to the displayed query 510. In some cases, if the query modification message indicated that an action model 520 was removed, the display modification may omit an updated query model 524. However, it will be understood that in some cases, each display modification message includes the query model 524 and the back-end query 524 (or edits for the query 510).

At block 1008, the query interface system 502 processes the display modification message and updates the GUI. As described herein, the query interface system 502 can perform various functions based on the content of the display modification message. For example, if the display modification message includes edits to the query 510 (or an instruction to edit the query 510), the query interface system 502 can edit the query 510. If the display modification message includes a query model 526 (or an instruction to generate action models 520), the display modification message can generate an actions model and display corresponding action model summaries. As described herein, at least with reference to block 906 of FIG. 9, the query interface system 502 can generate the action model 520 using the query model 526. In some cases, based on any changes to the query 510, the query interface system 502 can send the query to the data intake and query system 108 for execution and display the results on the GUI.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
    communicating a query to a semantic processing system, wherein the query comprises one or more query commands;
    receiving a query model from the semantic processing system, wherein the query model includes at least one command model corresponding to at least one query command of the one or more query commands;
    generating, based on the at least one command model, at least one interactive action model summary, wherein the at least one interactive action model summary provides a description of an action performed in response to the at least one query command; and
    causing a user interface to concurrently display:
    the query within a query editor panel of the user interface, and wherein the query editor panel enables editing of the query, and
    the at least one interactive action model summary within a query actions panel of the user interface, and wherein the query actions panel enables editing of the at least one interactive action model summary,
    wherein a modification to the query in the query editor panel causes an update to the query actions panel and wherein a modification to the at least one interactive action model summary causes an update to the at least one query command of the query in the query editor panel.

2. The method of claim 1, wherein communicating a query to a semantic processing system comprises communicating the query to the semantic processing system based on determination that the query has been edited.

3. The method of claim 1, wherein communicating a query to a semantic processing system comprises communicating the query to the semantic processing system based on a request to execute the query.

4. The method of claim 1, wherein causing the user interface to concurrently display comprises causing the user interface to concurrently display:
the query within the query editor panel,
the at least one interactive action model summary within the query actions panel, and
interactive query results within a query results panel of the user interface, wherein the query results panel enables interactions with the interactive query results, wherein an interaction with at least one query result of the query results causes an update to the query and the query actions panel.

5. The method of claim 1, further comprising:
generating, based on the query model, a query outline, wherein the query outline includes at least one identifier corresponding to a group of query commands of the query, wherein the group of query commands includes the at least one query command.

6. The method of claim 1,
wherein the at least one query command comprises a single query command,
wherein generating the at least one interactive action model summary comprises generating a plurality of interactive action model summaries based on the at least one command model, wherein a particular interactive action model summary of the plurality of interactive action model summaries provides a description of an action performed in response to the at least one query command,
wherein causing the user interface to concurrently display comprises causing the user interface to concurrently display:
the query within the query editor panel, and
the plurality of interactive action model summaries within the query actions panel, wherein the query actions panel enables editing of the plurality of interactive action model summaries, and
wherein a modification to the single interactive action model summary causes an update to the portion of the single query command of the query in the query editor panel.

7. The method of claim 1,
wherein the at least one query command comprises a single query command,
wherein generating the at least one interactive action model summary comprises generating a plurality of interactive action model summaries based on the at least one command model, wherein a particular interactive action model summary of the plurality of interactive action model summaries includes a description of an action performed in response to the at least one query command,
wherein causing the user interface to concurrently display comprises causing the user interface to concurrently display:
the query within the query editor panel, and
the plurality of interactive action model summaries within the query actions panel, wherein the query actions panel enables editing of the plurality of interactive action model summaries, and wherein removing the particular interactive action model summary causes removal of the portion of the single command of the query in the query editor panel.

8. The method of claim 1,
wherein the at least one query command comprises a plurality of query commands,
wherein generating the at least one interactive action model summary comprises generating a single interactive action model summary based on the at least one command model, wherein the single interactive action model summary provides a description of an action performed in response to the at least one query command,
wherein causing the user interface to concurrently display comprises causing the user interface to concurrently display:
the query within the query editor panel, and
the single interactive action model summary within the query actions panel, wherein the query actions panel enables editing of the single interactive action model summary, and
wherein a modification to the single interactive action model summary causes an update to the plurality of commands of the query in the query editor panel.

9. The method of claim 1,
wherein the at least one query command comprises a plurality of query commands,
wherein generating the at least one interactive action model summary comprises generating a single interactive action model summary based on the at least one command model, wherein the single interactive action model summary provides a description of an action performed in response to the at least one query command,
wherein causing the user interface to concurrently display comprises causing the user interface to concurrently display:
the query within the query editor panel, and
the single interactive action model summary within the query actions panel, wherein the query actions panel enables editing of the single interactive action model summary, and
wherein removing the single interactive action model summary causes removal of the plurality of commands from the query in the query editor panel.

10. The method of claim 1,
wherein the at least one query command comprises a plurality of query commands,
wherein the at least one query command model comprises a single command model that corresponds to the plurality of commands,
wherein generating the at least one interactive action model summary comprises generating a single interactive action model summary based on the single command model, wherein the single interactive action model summary provides a description of an action performed in response to the at least one query command,
wherein causing the user interface to concurrently display comprises causing the user interface to concurrently display:
the query within the query editor panel, and
the single interactive action model summary within the query actions panel, wherein the query actions panel enables editing of the single interactive action model summary, and wherein a modification to the single interactive action model summary causes an update to the plurality of commands of the query in the query editor panel.

11. The method of claim 1:
wherein the at least one command model comprises a plurality of command models that correspond to a single command of the at least one query command, wherein each command model of the plurality of command models corresponds to a portion of the command,
wherein generating the at least one interactive action model summary comprises generating a plurality of interactive action model summaries based on the plurality of command models, wherein each of the plurality of interactive action model summaries provides a description of a respective action that results from execution of a respective portion of the single command,
wherein causing the user interface to concurrently display comprises causing the user interface to concurrently display:
the query within the query editor panel, and
the plurality of interactive action model summaries within the query actions panel, wherein the query actions panel enables editing of the plurality of interactive action model summaries, and
wherein a modification to a particular interactive action model summary of the plurality of interactive action model summaries causes an update to the respective portion of the single command of the query in the query editor panel.

12. The method of claim 1, wherein the query is a first query, the at least one command model is a first at least one query command model, and the at least one interactive action model summary is a first at least one interactive action model summary, the method further comprising:
receiving an indication of a modification to the first query in the query editor panel;
based on the indication, generating a query modification message, wherein the query modification message includes the modification to the first query;
communicating the query modification message to the semantic processing system, wherein the semantic processing system updates a second query to form an updated second query and updates the query model to form an updated query model;
receiving the updated query model from the semantic processing system, wherein the updated query model includes a second at least one command model;
generating, based on the second at least one command model, a second at least one interactive action model summary, wherein the second at least one interactive action model summary provides a description of an action performed in response to the second at least one query command; and
causing the user interface to concurrently display:
the first query within the query editor panel, and
the second at least one interactive action model summary within the query actions panel of the user interface, and
wherein the query actions panel enables editing of the second at least one interactive action model summary.

13. The method of claim 1, wherein the query is a first query, the at least one command model is a first at least one command model, and the at least one interactive action model summary is a first at least one interactive action model summary, the method further comprising:
receiving an indication to modify the first query based on an interaction with a display object of the user interface:
based on the indication, generating a query modification message, wherein the query modification message includes the indication to modify the first query;
communicating the query modification message to the semantic processing system, wherein the semantic processing system updates a second query based on the query modification message to form an updated second query and updates the query model to form an updated query model;
receiving the updated query model and an indication of changes made to the second query to form the updated second query, wherein the updated query model includes a second command model corresponding to a second at least one query command of the one or more query commands;
updating the first query based on the indication of changes to form an updated first query, wherein the first updated query includes the second at least one query command;
generating, based on the second at least one command model, a second at least one interactive action model summary, wherein the second at least one interactive action model summary provides a description of an action performed in response to the second at least one query command; and
causing the user interface to concurrently display:
the updated first query within the query editor panel, and
the second at least one interactive action model summary within the query actions panel of the user interface, wherein the query actions panel enables editing of the second at least one interactive action model summary.

14. The method of claim 1, wherein the query is a first query, the at least one command model is a first at least one command model, and the at least one interactive action model summary is a first at least one interactive action model summary, the method further comprising:
receiving an indication of a modification to the at least one interactive action model in the actions panel of the user interface;
based on the indication, generating a query modification message, wherein the query modification message includes one or more parameters indicative of a change for the first query;
communicating the query modification message to the semantic processing system, wherein the semantic processing system updates a second query based on the query modification message to form an updated second query;
receiving an indication of changes made to the second query to form the updated second query;
updating the first query based on the indication of changes to form an updated first query; and
causing the user interface to display the first updated query within the query editor panel.

15. The method of claim 1, wherein the query is a first query, the at least one command model is a first at least one command model, and the at least one interactive action model summary is a first at least one interactive action model summary, the method further comprising:
receiving an indication of a modification to the at least one interactive action model in the actions panel of the user interface;

based on the indication, generating a query modification message, wherein the query modification message includes one or more parameters indicative of a change for the first query;
communicating the query modification message to the semantic processing system, wherein the semantic processing system updates a second query based on the query modification message to form an updated second query and updates the query model to form an updated query model based on the updated second query;
receiving the updated query model and an indication of changes made to the second query to form the updated second query, wherein the updated query model includes a second at least one command model;
updating the first query based on the indication of changes to form an updated first query;
generating, based on the second at least one command model, a second at least one interactive action model summary, wherein the second at least one interactive action model summary provides a description of an action performed in response to the second at least one query command; and
causing the user interface to concurrently display:
the updated first query within the query editor panel, and
the second at least one interactive action model summary within the query actions panel of the user interface, and wherein the query actions panel enables editing of the second at least one interactive action model summary.

16. The method of claim 1, wherein the query is a first query, the at least one query command is a first at least one query command, the at least one command model is a first at least one command model, and the at least one interactive action model summary is a first at least one interactive action model summary, wherein the user interface further concurrently displays interactive query results within a query results panel of the user interface, wherein the query results panel enables interactions with the interactive query results, the method the method further comprising:
receiving an indication of an interaction with at least one query result of the query results in the query results panel of the user interface;
based on the indication, generating a query modification message, wherein the query modification message includes one or more parameters indicative of a change for the first query;
communicating the query modification message to the semantic processing system, wherein the semantic processing system updates a second query based on the query modification message to form an updated second query and, based on the updated second query, updates the query model to form an updated query model;
receiving the updated query model and an indication of changes made to the second query to form the updated second query, wherein the updated query model includes the first at least one command model corresponding to the first at least one query command and a second command model corresponding to a second at least one query command of the one or more query commands;
updating the first query based on the indication of changes to form an updated first query, wherein the first updated query includes the first at least one query command and the second at least one query command;
generating, based on the second at least one command model, a second at least one interactive action model summary, wherein the second at least one interactive action model summary provides a description of an action performed in response to the second at least one query command; and
causing the user interface to concurrently display:
the updated first query within the query editor panel,
the first at least one interactive action model summary within the query actions panel of the user interface, and
the second at least one interactive action model summary within the query actions panel of the user interface, and wherein the query actions panel enables editing of the second at least one interactive action model summary.

17. A system comprising:
a data store; and
one or more processors configured to:
communicate a query to a semantic processing system, wherein the query comprises one or more query commands;
receive a query model from the semantic processing system, wherein the query model includes at least one command model corresponding to at least one query command of the one or more query commands;
generate, based on the at least one command model, at least one interactive action model summary, wherein the at least one interactive action model summary provides a description of an action performed in response to the at least one query command; and
cause a user interface to concurrently display:
the query within a query editor panel of the user interface, and wherein the query editor panel enables editing of the query, and
the at least one interactive action model summary within a query actions panel of the user interface, and wherein the query actions panel enables editing of the at least one interactive action model summary,
wherein a modification to the query in the query editor panel causes an update to the query actions panel and wherein a modification to the at least one interactive action model summary causes an update to the at least one query command of the query in the query editor panel.

18. The system of claim 17,
wherein the at least one query command comprises a single query command,
wherein to generate the at least one interactive action model summary, the one or more processors are configured to generate a plurality of interactive action model summaries based on the at least one command model, wherein a particular interactive action model summary of the plurality of interactive action model summaries provides a description of an action performed in response to the at least one query command,
wherein to cause the user interface to concurrently display, the one or more processors are configured to cause the user interface to concurrently display:
the query within the query editor panel, and
the plurality of interactive action model summaries within the query actions panel, wherein the query actions panel enables editing of the plurality of interactive action model summaries, and
wherein a modification to the single interactive action model summary causes an update to the portion of the single query command of the query in the query editor panel.

19. Non-transitory computer-readable media including computer-executable instructions that, when executed by a computing system, cause the computing system to:

communicate a query to a semantic processing system, wherein the query comprises one or more query commands;

receive a query model from the semantic processing system, wherein the query model includes at least one command model corresponding to at least one query command of the one or more query commands;

generate, based on the at least one command model, at least one interactive action model summary, wherein the at least one interactive action model summary provides a description of an action performed in response to the at least one query command; and cause a user interface to concurrently display:

the query within a query editor panel of the user interface, and wherein the query editor panel enables editing of the query, and the at least one interactive action model summary within a query actions panel of the user interface, and wherein the query actions panel enables editing of the at least one interactive action model summary, wherein a modification to the query in the query editor panel causes an update to the query actions panel and wherein a modification to the at least one interactive action model summary causes an update to the at least one query command of the query in the query editor panel.

20. The non-transitory computer-readable media of claim 19, wherein the at least one query command comprises a plurality of query commands, wherein generating the at least one interactive action model summary comprises generating a single interactive action model summary based on the at least one command model, wherein the single interactive action model summary provides a description of an action performed in response to the plurality of commands, wherein to cause the user interface to concurrently display, the computer-executable instructions cause the computing system to cause the user interface to concurrently display:

the query within the query editor panel, and the single interactive action model summary within the query actions panel, wherein the query actions panel enables editing of the single interactive action model summary, and wherein removing the single interactive action model summary causes removal of the plurality of commands from the query in the query editor panel.

* * * * *